(12) United States Patent
Uemoto

(10) Patent No.: US 7,447,417 B2
(45) Date of Patent: Nov. 4, 2008

(54) BACKLIGHT ASSEMBLY AND DISPLAY DEVICE HAVING THE SAME

(75) Inventor: Tsutomu Uemoto, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/431,355

(22) Filed: May 9, 2006

(65) Prior Publication Data

US 2006/0251377 A1 Nov. 9, 2006

(30) Foreign Application Priority Data

May 9, 2005 (KR) ............... 10-2005-0038472

(51) Int. Cl.
*G02B 6/10* (2006.01)
*G02F 1/1335* (2006.01)

(52) U.S. Cl. ............... 385/146; 349/65; 349/113

(58) Field of Classification Search ............... None
See application file for complete search history.

(56) References Cited

U.S. PATENT DOCUMENTS 6,825,285 B2 * 11/2004 Autran et al. ............... 525/418

| | | | |
|---|---|---|---|
| 2001/0022636 A1 * | 9/2001 | Yang et al. | 349/65 |
| 2002/0000979 A1 * | 1/2002 | Furuhashi et al. | 345/173 |
| 2002/0101399 A1 * | 8/2002 | Kubo et al. | 345/104 |
| 2003/0151354 A1 * | 8/2003 | Takizawa | 313/498 |
| 2004/0051827 A1 * | 3/2004 | Hinata et al. | 349/113 |

* cited by examiner

*Primary Examiner*—Tina M Wong
(74) *Attorney, Agent, or Firm*—Alma P. Levy; MacPherson Kwok Chen & Heid LLP

(57) ABSTRACT

A backlight assembly may include a light guide unit, a light source and a reflection module. The light source provides light onto an incident face of the light guide unit. The reflection module may include a first substrate having reflection regions, a lower electrode disposed in each reflection region, a switch element applying an on or off signal to the lower electrode, and an upper electrode. The upper electrode makes contact with or is spaced apart from a reflective face of the light guide unit in accordance with the on or off signal. Thus, light selectively exits the light guide unit through an exiting face of the light guide unit corresponding to each reflection region. A display device has a display module disposed on the exiting face of the light guide unit to display an image. Therefore, the display device has a simplified structure.

28 Claims, 19 Drawing Sheets

BACKLIGHT ASSEMBLY AND DISPLAY DEVICE HAVING THE SAME

CROSS-REFERENCE TO RELATED APPLICATIONS

This application relies for priority upon Korean Patent Application No. 2005-38472 filed on May 9, 2005, the contents of which are herein incorporated by reference in their entirety.

BACKGROUND OF THE INVENTION

1. Field of the Invention

The present invention relates to a backlight assembly and a display device having the backlight assembly. More particularly, the present invention relates to a backlight assembly capable of selectively emitting light in each reflection region and a display device having the backlight assembly.

2. Description of the Related Art

Generally, a display device is an interface device converting electrical format data from an input device into an image. Examples of display devices include cathode ray tube (CRT) type display devices, liquid crystal display (LCD) devices, plasma display panel (PDP) devices, field emission display (FED) devices, etc.

CRT type display devices have a number of benefits, such as a low price, a rapid input/output speed, a large viewing angle, etc. However, CRT type display devices also have a number of drawbacks, such as a large volume, a high power consumption, etc. In order to overcome many of the drawbacks of CRT type display devices, flat panel display devices have recently been developed.

Flat panel display devices such as LCD devices, PDP devices and FED devices have many merits; for example, they are lightweight and thin. As a result, flat panel display devices are widely used for television receivers, a portable computers, cellular phones, etc.

However, flat panel display devices include complex and high priced parts. For example, LCD devices generally include an LCD panel and a backlight assembly. The LCD panel has two glass substrates and a liquid crystal installed between the two glass substrates. The backlight assembly provides light for the LCD panel. The LCD panel is manufactured using a complex process, and includes high priced optical components such as a polarized film, a prism sheet, etc. It is also relative difficult and expensive to manufacture a large LCD device. In addition, a single defective cell formed on the glass substrates of the LCD panel may render the entire LCD panel defective.

PDP devices display an image using light that is generated by applying a high voltage to a gas mixture contained in a cell, to induce collisions of electrons in the mixture gas. PDP devices are very expensive, and include cooling devices to dissipate the significant heat generated by the high power consumption of the PDP device.

In an FED device, vacuum is formed between a pair of glass substrates. An electromagnetic wave is discharged from the one of the glass substrates, and passes through a fluorescent material. The electromagnetic wave strikes the other of the glass substrates to display an image. FED devices are very expensive, and very sensitive to the surface of the glass substrates. Technically complex vacuum equipment is required for the manufacturing process of FED devices.

Therefore, development of a display device with a simple structured display panel and/or a simple structured backlight assembly, with few defects and low price is required.

SUMMARY OF THE INVENTION

To address the above problems, embodiments of the present invention provide a backlight assembly functioning as a light shutter to selectively reflect light in each of a plurality of reflection regions.

Embodiments of the present invention also provide for a display device having the above-mentioned backlight assembly and a simplified display module.

In one aspect of the present invention, a backlight assembly includes a light guide unit, a light source and a reflection module. The light source provides light onto an incident face of the light guide unit. The reflection module is disposed under the light guide unit to reflect or scatter the light from the light guide unit.

The reflection module optionally includes a first substrate, a lower electrode, a switch element and an upper electrode. The first substrate has a surface facing a reflective face of the light guide unit and a plurality of reflection regions formed over the surface. The lower electrode is disposed in each of the reflection regions. The switch element is disposed on the first substrate to apply an on signal or an off signal to the lower electrode. The upper electrode is positioned corresponding to the lower electrode. The upper electrode makes contact with or is spaced apart from the reflective face of the light guide unit in accordance with the on signal or the off signal so as to emit the light that is incident onto the reflective face of the light guide unit through an exiting face of the light guide unit.

The lower electrode may allow the upper electrode to be spaced apart from the reflective face of the light guide unit in response to the off signal so as to totally reflect the light that is incident onto the reflective face and totally reflect the reflected light on the exiting face of the light guide unit. The lower electrode may allow the upper electrode to make contact with the reflective face of the light guide unit in response to the on signal so as to reflect the light that is incident onto the reflective face and emit the reflected light through the exiting face of the light guide unit.

The backlight assembly may further include an optical member. The optical member is disposed between the light guide unit and the reflection module, and has a refractive index greater than that of the light guide unit. The optical member may make contact with the reflective face of the light guide unit. The lower electrode may allow the upper electrode to make contact with the reflective face of the light guide unit in response to the off signal so as to reflect the light that is incident onto the reflective face of the light guide unit and emit the reflected light through the exiting face of the light guide unit. The lower electrode may allow the upper electrode to be spaced apart from the reflective face of the light guide unit in response to the on signal so as to totally reflect the light that is incident onto the reflective face of the light guide unit and totally reflect the reflected light on the exiting face of the light guide unit.

The reflection module optionally includes a first insulation layer, a second insulation layer and a plurality of spacers. The first insulation layer is formed on the lower electrode to insulate the lower electrode from outside. The second insulation layer faces the first insulation layer, and the upper electrode is disposed on the second insulation layer. The spacers are formed between the first and second insulation layers to support the second insulation layer. The spacers correspond to a peripheral portion of the lower electrode.

The second insulation layer optionally includes a fixing portion fixed to an upper portion of each of the spacers and a free portion opposite to the fixing portion. The upper electrode is spaced apart from the reflective face of the light guide unit when the free portion is bent toward a central portion of the lower electrode.

The reflection module optionally includes a plurality of first signal lines and a plurality of second signal lines. The first signal lines are arranged on the first substrate in a first direction to apply a control signal to the switch element. The control signal controls whether the on signal or the off signal is applied to the lower electrode. The second signal lines are arranged on the first substrate in a second direction crossing the first direction to apply the on signal or the off signal to the lower electrode.

In another aspect of the present invention, a display device includes a light guide unit, a light source, a reflection module and a display module.

The display module is disposed over the light guide unit to display an image using the light from the light guide unit. The display module may include color pixels formed in a plurality of pixel regions.

In general, in another aspect, a display apparatus includes a light guide including an optical interface surface and a light exit surface different than the optical interface surface. The apparatus further includes a plurality of optical reflector elements configured to reflect incident light and a first actuator configured to selectively position a first optical reflector element in a first position away from the optical interface surface or a second position proximate to the optical interface surface. The apparatus is further configured so that in response to an "on" control signal, the first actuator is configured to selectively position the first optical reflector element in one of the first position or the second position to reflect light to be transmitted through a first associated region of the light exit surface of the light guide.

The first actuator may comprises a first electrode configured to generate an electric field in response to a first control voltage, and the first optical reflector may comprise a second electrode on a flexible material. The light guide includes an incident surface positioned to receive light from a light source. In response to an "off" control signal, the first actuator may be configured to selectively position the first optical reflector element in the other of the first position and the second position so that light is substantially not transmitted through the first associated region of the light exit surface of the light guide.

The apparatus may include a plurality of actuators each configured to position an associated optical reflector elements in a first position away from the optical interface surface or a second position proximate to the optical interface surface in response to an associated "on" control signal, and configured to position the associated optical reflector in the other of the first position and the second position in response to an associated "off" control signal.

Each of the plurality of optical reflectors may be associated with a region of the light exit surface of the light guide, and the display apparatus may be configured to totally internally reflect light from each region of the light exit surface of the light guide associated with an optical reflector positioned in the other of the first position and the second position in response to the associated "off" control signal.

The light guide may comprise a material with an index of refraction n1 greater than the index of refraction of air. In response to an "on" control signal, the first actuator may be configured to selectively position the first optical reflector element in the second position.

The light guide may include a first material having an index of refraction n1 greater than the index of refraction of air, and a second material having an index of refraction n2 greater than n1, and the optical interface surface may be a surface of the second material.

The apparatus may further comprise a display module including a plurality of pixels, each pixel positioned to receive light from at least one associated region of the light exit surface of the light guide.

According to the above, a display device having simplified structure and fewer defects as an LCD device, a PDP device, and so on may be provided.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF THE EMBODIMENTS

Figure 1:
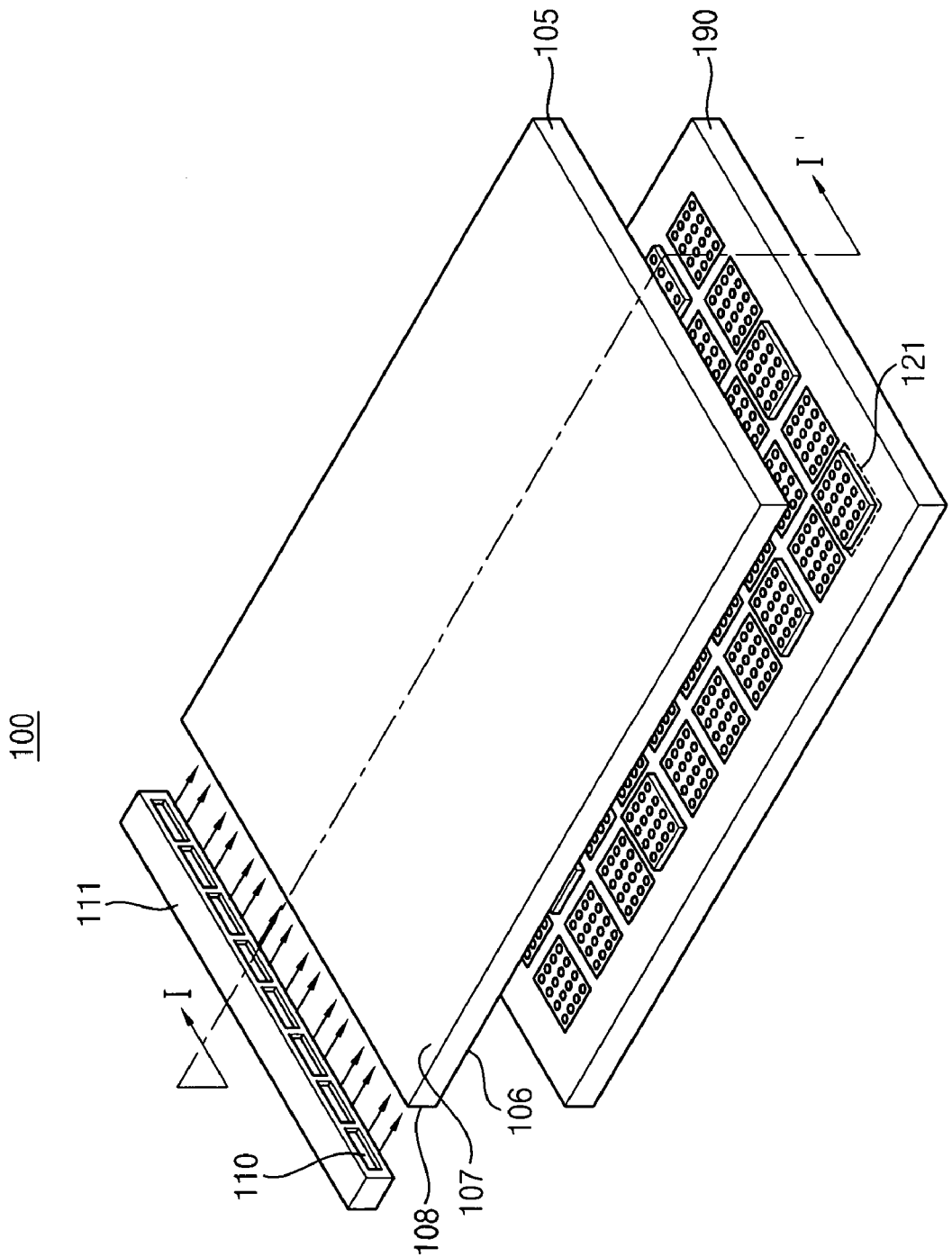
FIG. 1 is an exploded perspective view illustrating a backlight assembly according to an exemplary embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully describe the invention to those skilled in the art. Like reference numerals refer to similar or identical elements throughout.

Backlight Assembly

Figure 2:
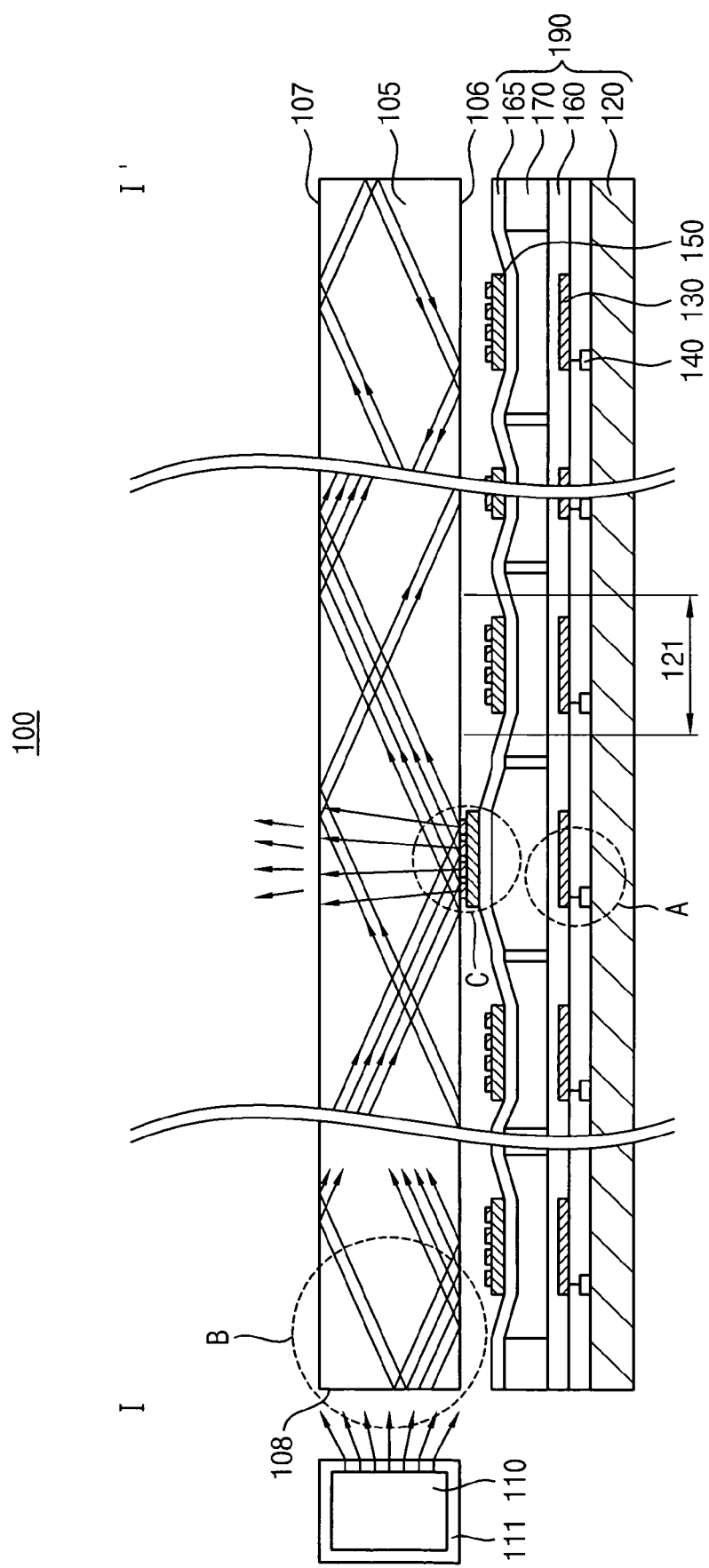
FIG. 2 is a cross-sectional view taken along a line I-I' in FIG. 1.

FIG. 1 is an exploded perspective view illustrating a backlight assembly according to an exemplary embodiment of the present invention. FIG. 2 is a cross-sectional view taken along a line I-I' in FIG. 1.

Referring to FIGS. 1 and 2, a backlight assembly 100 includes a light guide such as a light guide unit 105, a light source 110 and a reflection module 190.

The light guide unit 105 changes an optical path. The light guide unit 105 includes a reflective face 106, an exiting face 107 and an incident face 108. The light guide unit 105 in the illustrated example has a plate shape. The reflective face 106 and the exiting face 107 face each other. The incident face 108 connects an edge portion of the reflective face 106 to an edge portion of the exiting face 107 corresponding to the edge portion of the reflective face 106.

The light guide unit 105 includes, for example, a material having various characteristics such as a high optical transmissivity, a high heat resistance, a high chemical resistance, a large mechanical strength, etc. The light guide unit 105 may include, for example, polymethyl methacrylate (PMMA).

The light source 110 faces the incident face 108 of the light guide unit 105 to irradiate light onto the incident face 108. The light source 110 may be disposed such that light incident into the light guide unit 105 is totally internally reflected on the reflective face 106 and the exiting face 107.

As shown in FIG. 2, the backlight assembly 100 may include a light reflector such as light-reflecting member 111. The light-reflecting member 111 partially encloses a housing of the light source 110, and reflects light generated by the light source 110 toward the incident face 108. The light source 110, for example, includes a light emitting diode. Alternatively, the light source 110 may include a fluorescent lamp.

The light transmitted into the light guide unit 105 advances in the light guide unit 105, and is totally reflected from the reflective face 106. The reflection module 190 scatters the light on a portion of the reflective face 106, and totally reflects on another portion of the reflective face 106.

The reflection module 190 is disposed to face the reflective face 106. The reflection module 190 includes a first substrate 120, a plurality of lower electrodes 130, a plurality of switch elements 140, and a plurality of upper electrodes 150.

In one embodiment, each of the lower electrodes 130 is associated with one of the switch elements 140 and one of the upper electrodes 150. In this embodiment, each of the lower electrodes 130 have substantially same function and structure as the other lower electrodes 130, each of the switch elements 140 have substantially same function and structure as the other switch elements 140, and each of the upper electrodes 150 have substantially same function and structure as the other upper electrodes 150. Thus, one lower electrode, one switch element, and one upper electrode will be described in detail hereinafter.

The first substrate 120 has, for example, a plate shape, and may include glass. The first substrate 120 has a plurality of reflection regions 121 facing the reflective face 106 and selectively reflecting light. As shown in FIG. 1, the reflection regions 121 are arranged in a matrix shape.

The lower electrode 130 is formed in each of the reflection regions 121. The lower electrode 130 may include one or more metal materials having a high electrical conductivity. The lower electrode 130, for example, includes aluminum (Al). The lower electrode 130 may be formed in a thin film form, and may have a micrometer-sized width and a micrometer-sized thickness. An on signal or an off signal is applied to the lower electrode 130 from outside reflection module 190.

The reflection module 190 optionally includes a first insulation layer 160 to insulate the lower electrode 130 from outside reflection module 190. The first insulation layer 160 is formed on the first substrate 120 having the lower electrode 130. The first insulation layer 160 may be formed on an entire surface of the first substrate 120. The first insulation layer 160 may include a material having a high permittivity, for example, such as aluminum oxide ($Al_2O_3$).

The reflection module 190 may further include a spacer 170 to space the lower electrode 130 apart from the upper electrode 150 that will be described later. The spacer 170 is disposed on the first insulation layer 160. The spacer 170 is positioned corresponding to a peripheral portion of the lower electrodes 130. The spacer 170 includes, for example, silicon carbide (SiC).

Referring again to FIG. 2, the reflection module 190 may further include a second insulation layer 165 that insulates the upper electrode 150 from the lower electrode 130, and moves the upper electrode 150 up and down. The second insulation layer 165 is supported by the spacer 170, and is formed to face the first insulation layer 160. The second insulation layer 165 includes, for example, a material having a good insulation property and a high permittivity. The second insulation layer 165 may be flexible so as to move up and down relatively easily. The second insulation layer 165, for example, includes silicon dioxide ($SiO_2$).

The upper electrode 150 is formed on the second insulation layer 165 to face the associated lower electrode 130. Thus, the upper electrode 150 is formed in each of the reflection regions 121. The upper electrode 150 may include a metal having a high electrical conductivity. The upper electrode 150 includes, for example, aluminum (Al). The upper electrode 150 may be formed in a thin film form, and may have a few to tens of micrometer-sized width and a few to tens of micrometer-sized thickness. A common voltage is applied to the upper electrode 150 from outside reflection module 190.

Figure 3:
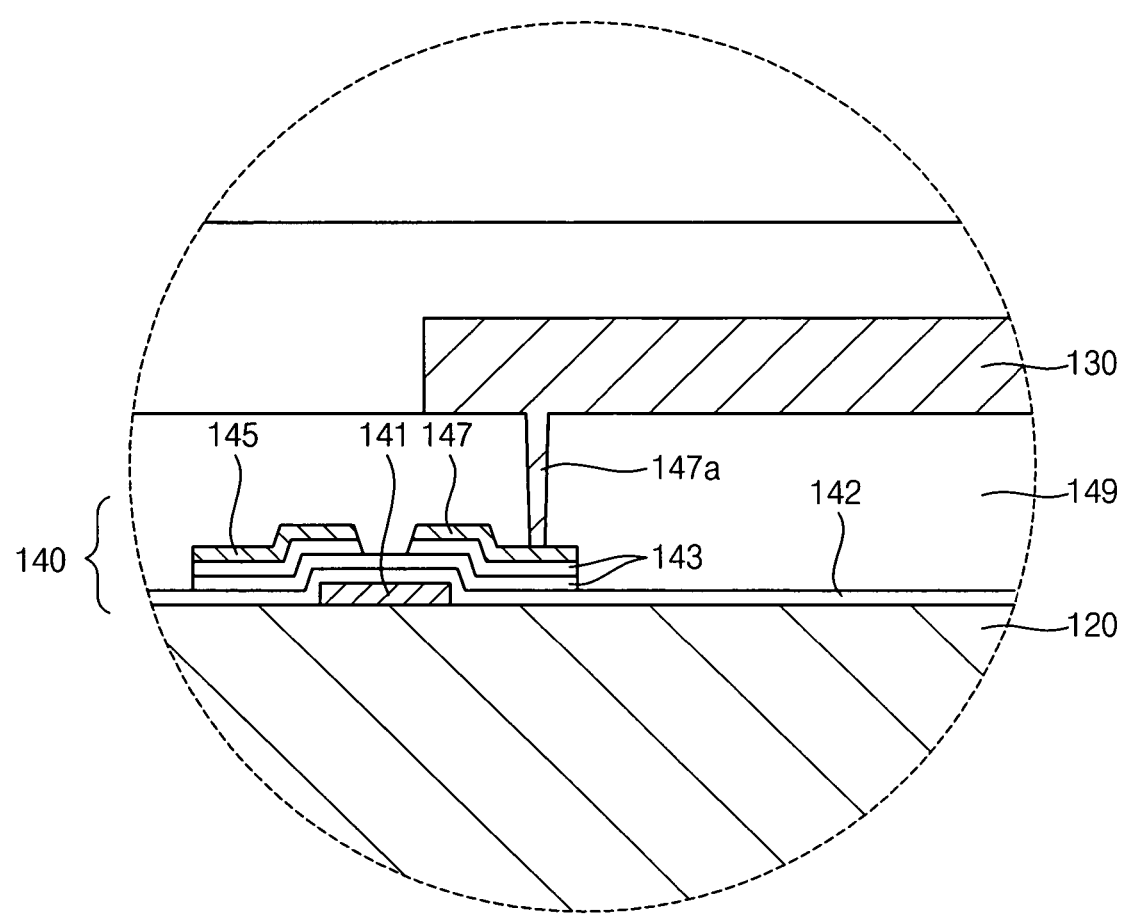
FIG. 3 is an enlarged view illustrating the first region 'A' shown in FIG. 2.

FIG. 3 is an enlarged view illustrating the first region 'A' shown in FIG. 2.

Referring to FIG. 3, the switch element 140 is formed on the first substrate 120 before the lower electrode 130 is formed. The switch element 140 applies the externally provided on or off signal to the lower electrode 130. The on or off signal may have the same polarity as that of a common signal applied to the upper electrode 150 shown in FIG. 2. The other of the on or off signal may have a different polarity from that of the common signal applied to the upper electrode 150 shown in FIG. 2. In one embodiment, the one of the on and off signals which has the same polarity as that of the common signal corresponds to the on signal, while the other of the on and off signals which has the different polarity from that of the common signal corresponds to the off signal.

Referring to FIGS. 1, 2 and 3, a repulsive force from the lower electrode 130 acts on the upper electrode 150 facing the lower electrode 130 to which the on signal is applied. Thus, the second insulation layer 165 moves up toward the reflective face 106 of the light guide unit 105. As the second insulation layer 165 moves up, the upper electrode 150 becomes closer to the reflective face 106.

In contrast, an attractive force from the lower electrode 130 acts on the upper electrode 150 facing the lower electrode 130 to which the off signal is applied. Thus, the second insulation layer 165 moves down toward the lower electrode 130. Hence, the upper electrode 150 moves farther from the reflective face 106 of the light guide unit 105.

The switch element 140 includes a gate electrode 141, a semiconductor layer 143, a data electrode 145 and a drain electrode 147 to apply the on or off signal to the lower electrode 130.

The gate electrode 141 is formed on the first substrate 120 in a first direction. A control signal (a gate on signal or a gate off signal) is applied to the gate electrode 141 of the switch element 140. The control signal controls which of the on and off signals is applied to the lower electrode 130.

The switch element 140 may further include a third insulation layer 142 formed on the gate electrode 141. The third insulation layer 142 may be formed on an entire surface of the first substrate 120 facing the reflective face 106 of the light guide unit 105. The semiconductor layer 143 is formed on the third insulation layer 142.

The data electrode 145 is formed on the semiconductor layer 143 in a direction that is substantially perpendicular to the first direction. A portion of the data electrode 145 is overlaid on the gate electrode 141. The on or off signal is applied to the data electrode 145.

The drain electrode 147 is formed on the semiconductor layer 143 and is substantially symmetrical to the data electrode 145. As shown in the embodiment of FIG. 3, the reflection module 190 may further include a fourth insulation layer 149 formed on the entire surface of the first substrate 120 having the data electrode 145 and drain electrode 147 formed thereon. A contact hole is formed through the fourth insulation layer 149, and the drain electrode 147 may be electrically connected to the lower electrode 130 via a contact portion 147a formed by filling the contact hole.

When the gate on signal is applied to the gate electrode 141, the on or off signal applied to the data electrode 145 is applied to the lower electrode 130 through the drain electrode 147.

Figure 4:
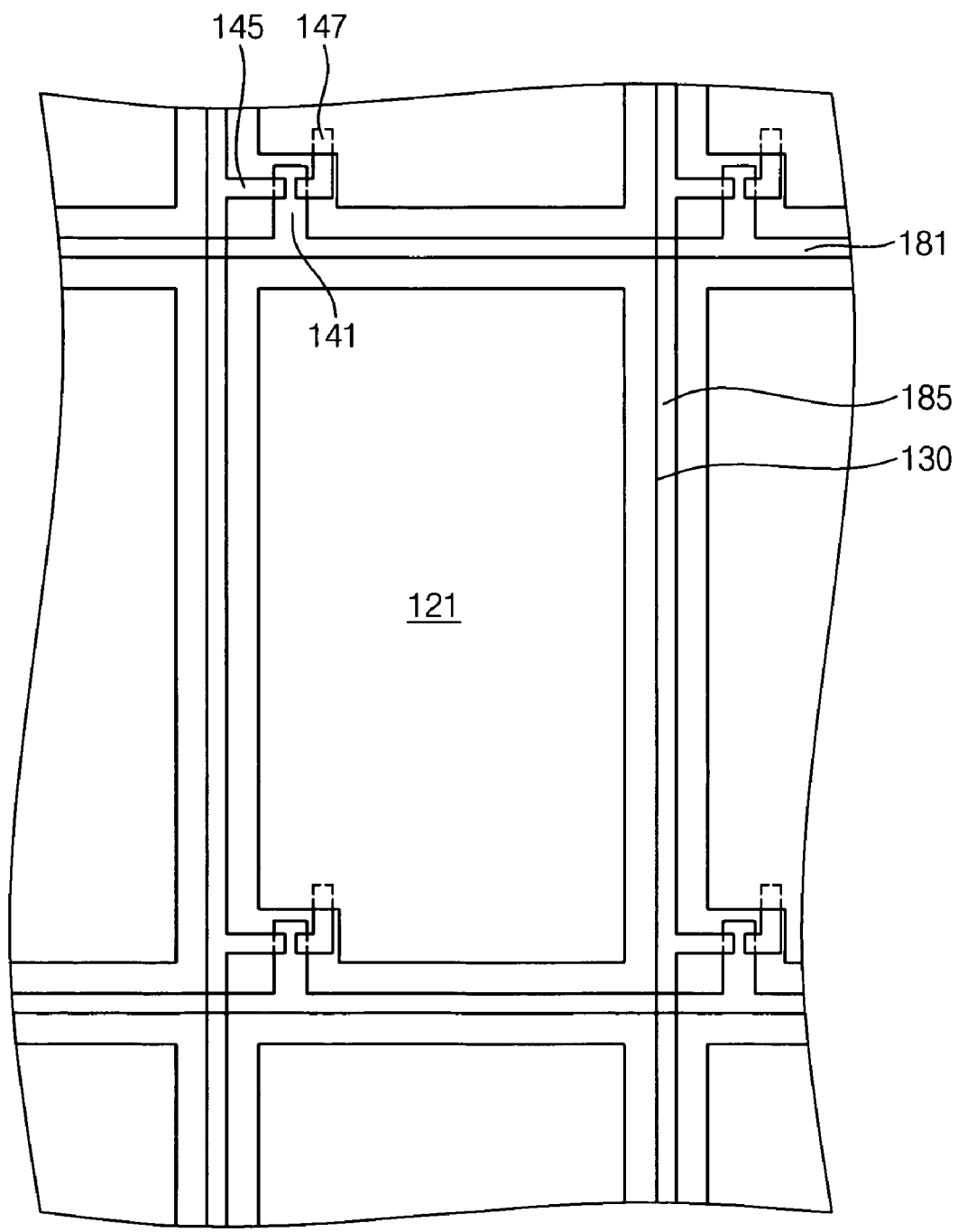
FIG. 4 is a layout illustrating a portion of the reflection module shown in FIG. 2.

FIG. 4 is a layout illustrating a portion of the reflection module shown in FIG. 2. FIG. 4 illustrates the first substrate 120 having the lower electrode 130 formed thereon.

Referring to FIGS. 2 to 4, the reflection module 190 may further include a plurality of first signal lines 181 and a plurality of second signal lines 185.

The first signal lines 181 are arranged on the first substrate 120 in the first direction. The first signal lines 181 are substantially parallel to each other. The first signal lines 181 are formed with the gate electrode 141, and the gate electrode 141 protrudes from the first signal lines 181. The first signal lines 181 apply the control signal to the gate electrode 141.

The second signal lines 185 are arranged on the first substrate 120 in a second direction crossing the first direction. The second signal lines 185 are substantially parallel to each other. The second signal lines 185 are formed with the data electrode 145 and the drain electrode 147, and the data electrode 145 protrudes from the second signal lines 185. The second signal lines 185 apply the on or off signal to the data electrode 145.

As shown in FIG. 4, consecutive first signal lines 181 and consecutive second signal lines 185 define one of the reflection regions 121.

Figure 5:
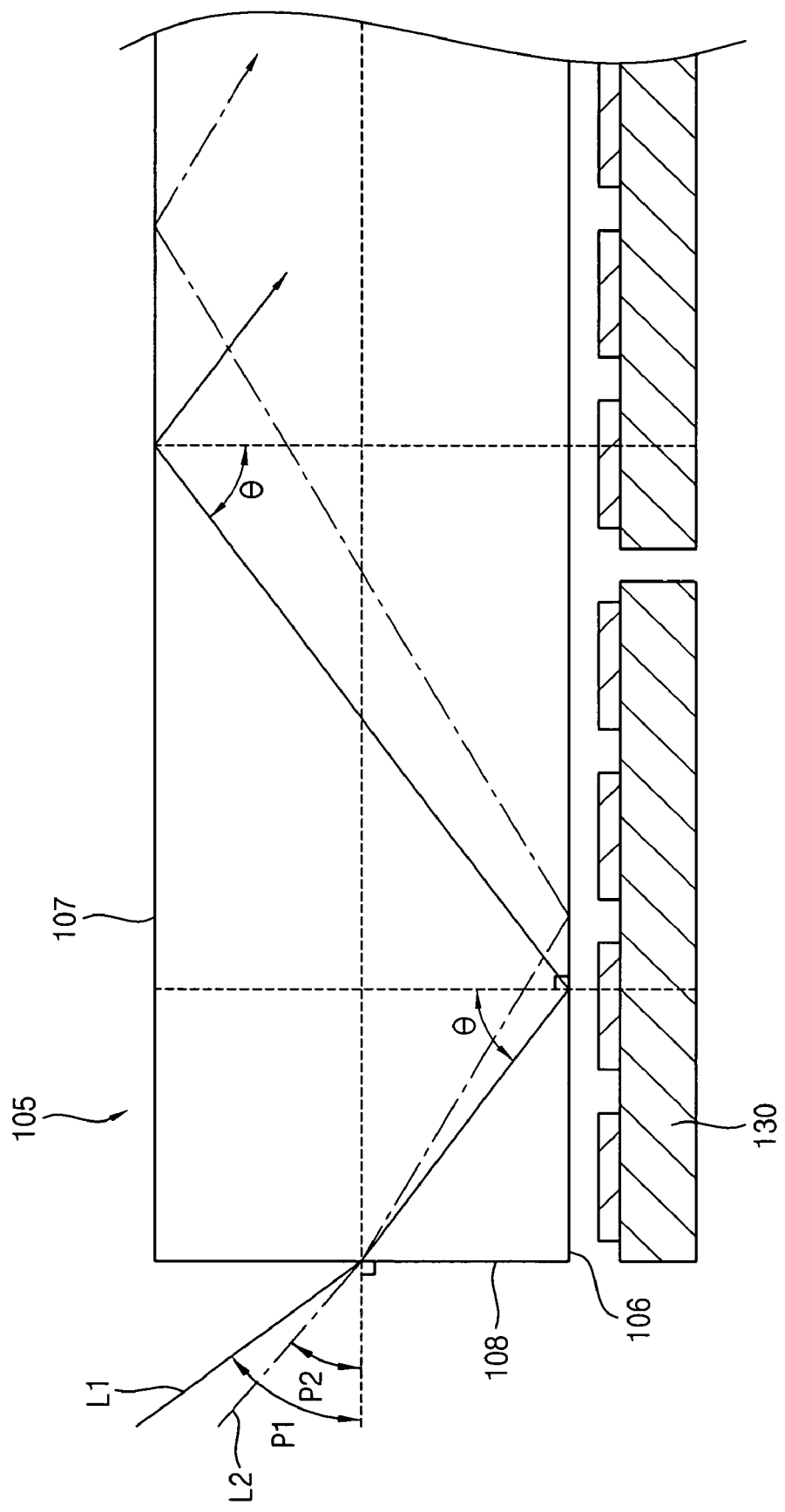
FIG. 5 is an enlarged view illustrating the second region 'B' shown in FIG. 2.
Figure 6:
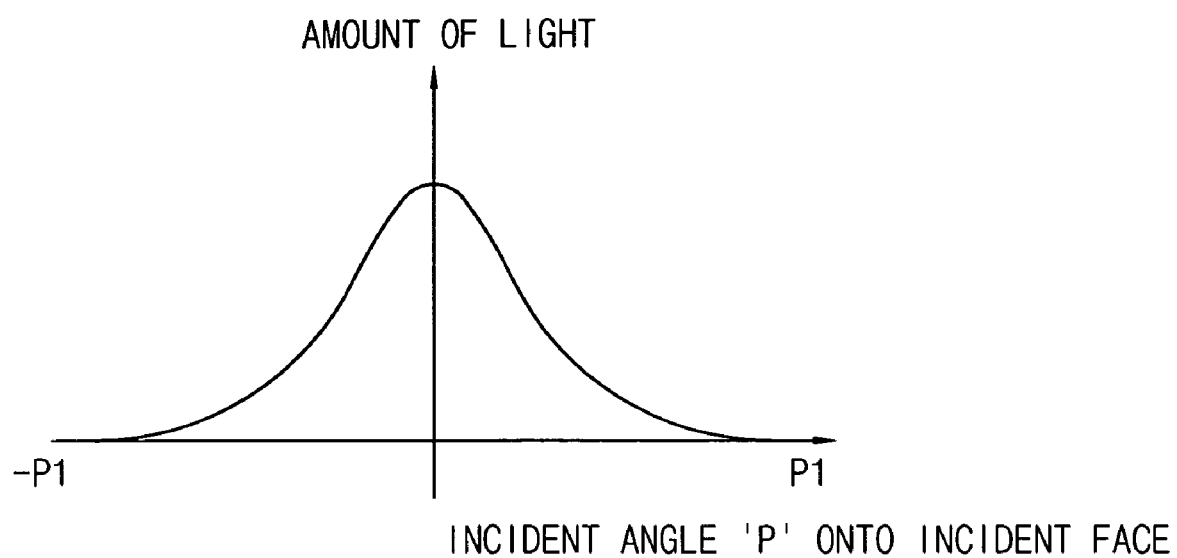
FIG. 6 is a graph illustrating a relationship between an incident angle 'P' onto the incident face in FIG. 5 and an amount of light.

FIG. 5 is an enlarged view illustrating a second region 'B' shown in FIG. 2. FIG. 5 illustrates an optical path of light at a portion of light guide unit 105 adjacent to the incident face 108. FIG. 6 is a graph illustrating a relationship between an incident angle 'P' onto the incident face in FIG. 5 and an amount of light received at the incident face from light source 110.

Referring to FIGS. 5 and 6, light incident on the incident face 108 from the light source 110 forms an incident angle that ranges from a negative first angle −P1 to a positive first angle +P1 with respect to a virtual line that is substantially perpendicular to the light incident face 108.

The amount of incident light increases as the incident angle decreases. First light L1 is defined as light that is incident onto the incident face 108 at an incident angle of the first angle P1, and second light L2 is defined as light that is incident onto the incident face 108 at an incident angle of a second angle P2. The second angle P2 is smaller than the first angle P1.

The first light L1 is incident onto the incident face 108 of the light guide unit 105, and then refracted at the incident face 108. The refracted first light L1 is incident onto the reflective face 106 at an incident angle referred to as third angle θ. The second light L2 is incident onto the incident face 108 of the light guide unit 105, and then refracted at the incident face 108. The refracted second light L2 is incident onto the reflective face 106 at an incident angle that is larger than the third angle θ.

When the upper electrode 150 is spaced apart from the reflective face 106, the reflective face 106 corresponds to an interface between the light guide unit 105 and an air layer. A refractive index of the light guide unit 105 (hereinafter, a refractive index indicates a relative index of refraction with respect to air, that is, an absolute index of refraction) is larger than that of the air layer.

Thus, according to Snell's law, when light in the light guide unit 105 is incident onto the reflective face 106 at an incident angle that is greater than a critical angle, the light is totally reflected (i.e., none is transmitted through the interface into the air layer). The critical angle indicates an incident angle at above which a wave is totally internally reflected, for a configuration in which the wave is traveling in a more dense medium and is incident on an interface with a less dense medium.

As shown in FIG. 5, the first angle P1 at which the first light L1 is incident onto the incident face 108 is the largest angle of incidence for light received at incident face 108 from light source 110. Other incident angles corresponding to light having a different optical path from the first light L1 are smaller than P1 (e.g., angle P2 which corresponds to light L2). However, the third angle θ at which the first light L1 is incident onto the reflective face 106 is smaller than incident angles for light from light source 110 having a different optical path from the first light L1 (e.g., light L2). Thus, when the system is configured so that the first light L1 is totally reflected on the reflective face 106, it is obvious that light received from light source 110 having other optical paths is also totally internally reflected on the reflective face 106, since its incident angle is also greater than the critical angle.

In addition, it is clear that the totally reflected light is totally reflected again on the exiting face 107 that is substantially parallel to the reflective face 106.

Accordingly, when the incident angle (the third angle θ) of the first light L1 onto the reflective face 106 is greater than a critical angle for the reflective face 106, the light that is incident into the light guide unit 105 from the light source 110 through the incident face 108 is totally reflected on the reflective face 106 and the exiting face 107 of the light guide unit 105, so that the light is confined within the light guide unit 105.

According to Snell's law, a sine value of the critical angle for the reflective face 106 is given by sin(the critical angle) =1/n. The 'n' indicates a refractive index of the light guide unit 105 with respect to air. When the critical angle is equal to the incident angle (the third angle θ) at which the first light L1 is incident onto the reflective face 106, the refractive index of the light guide unit 105 is determined by an equation of $\sin(\theta)=1/n$.

As explained in more detail below, the current systems and techniques allow for a material of a higher index of refraction than air (e.g., the material of upper electrode 150) to be selectively brought to reflective face 106 to change the local optical characteristics of the interface with reflective face 106. At least a portion of the light incident on the interface between light guide 105 and first electrode 150 is scattered at an angle such that it exits the light guide unit 105 through exiting face 107 rather than continuing to be totally internally reflected in light guide unit.

That is, the light that is incident into the light guide unit 105 from the light source 110 does not arbitrarily exit the light guide unit 105 through the exiting face 107, but selectively may exit the light guide unit 105 through the exiting face 107 by a predetermined action on the reflective face 106. As a result, the backlight assembly 100 may function as a light shutter to control the selective exit from light guide unit 105 of light incident on the reflective face 106, in each of the reflection regions 121.

When the light guide unit 105 has the refractive index greater than the refractive index determined by the equation of $\sin(\theta)=1/n$, the critical angle for the reflective face 106 decreases, so that an amount of the light that is totally reflected on the reflective face 106 increases. Thus, the light guide unit 105 may have the refractive index greater than the refractive index determined by the equation of $\sin(\theta)=1/n$.

Figure 7:
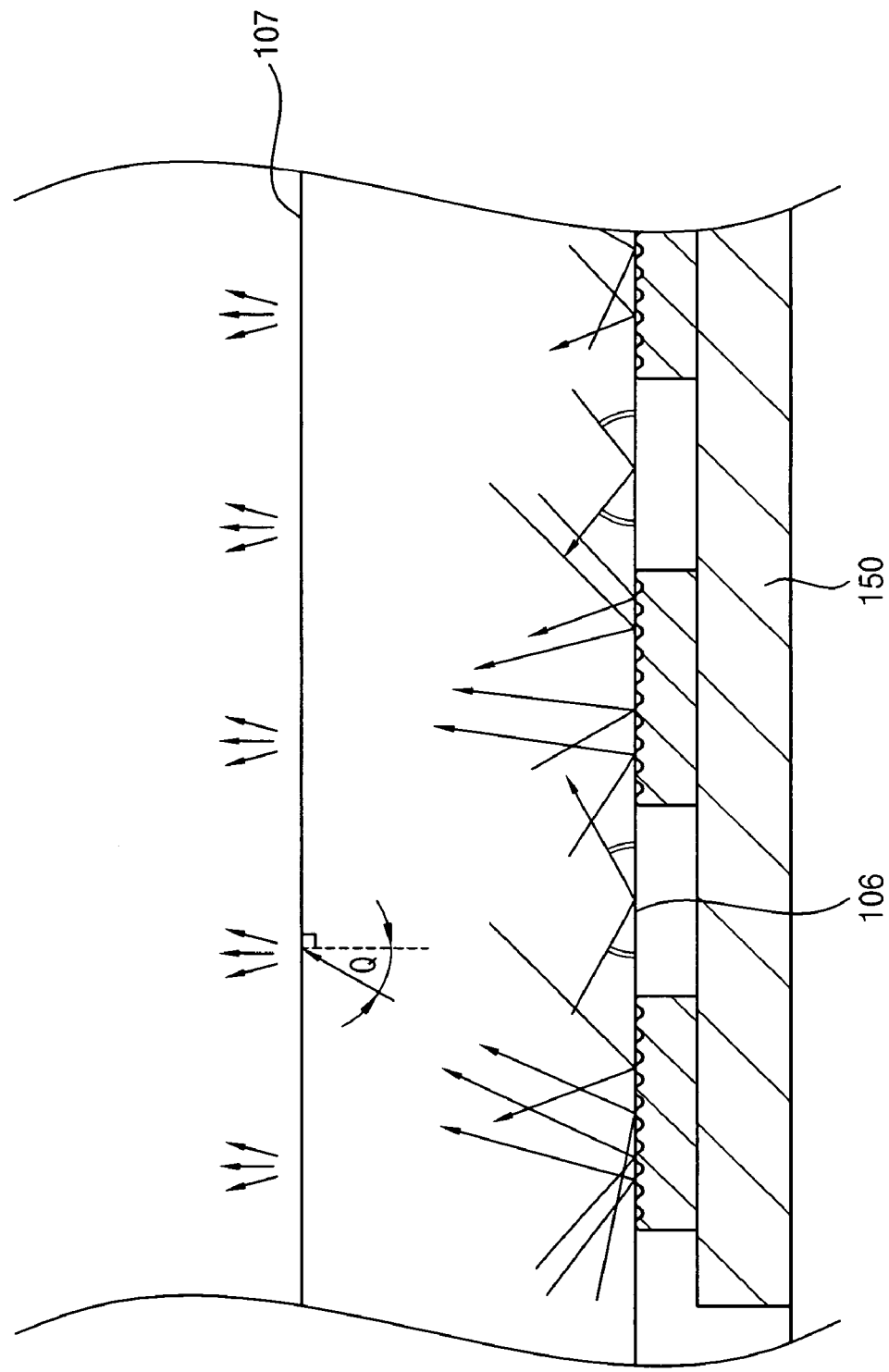
FIG. 7 is an enlarged view illustrating the third region 'C' shown in FIG. 2.
Figure 8:
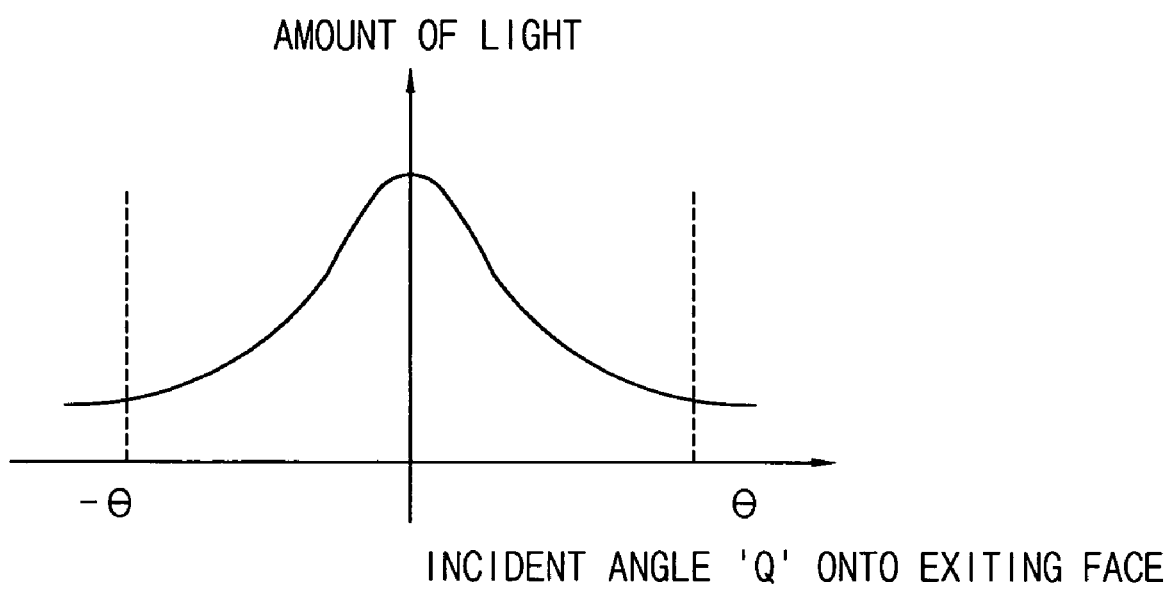
FIG. 8 is a graph illustrating a relationship between an incident angle 'Q' onto the exiting face in FIG. 7 and an amount of light.

FIG. 7 is an enlarged view illustrating the third region 'C' shown in FIG. 2. FIG. 5 illustrates an optical path of light at a portion of the reflective face 106 of the light guide unit 105, the portion making contact with the upper electrode 150. FIG. 8 is a graph illustrating a relationship between an incident angle 'Q' onto the exiting face in FIG. 7 and an amount of light incident on the exiting surface at that angle.

Referring to FIGS. 7 and 8, the light in the light guide unit 105 is incident onto the portion of the reflective face 106 of the light guide unit 105 with which the upper electrode 150 makes contact, and then scattered.

The upper electrode 150 may include a metal. In one embodiment, the upper electrode 150 is in an aluminum (Al) thin film form. Since light does not pass through metal in general, refraction of incident light onto metal does not occur. In addition, total reflection may be generated only when light goes from a more dense to a less dense medium.

Thus, light incident on the portion of reflected face 106 with which the upper electrode 150 makes contact is not totally internally reflected (because of its relatively large density), but instead is reflected or scattered based on surface characteristics of the upper electrode 150. The upper electrode 150 has a microscopically nonflat surface on which various convex and concave portions are formed. Thus, light that is incident onto the portion of the reflective face 106 with which the upper electrode 150 makes contact is scattered toward the exiting face 107.

As shown in FIG. 8, most of the scattered light is incident onto the exiting face 107 at an incident angle that is smaller than a critical angle for the exiting face 107 (which is equal to the critical angle for an air interface with the reflective face 106). Thus, most of the scattered light may exit the light guide unit 105 through the light exiting face 107.

Figure 9:
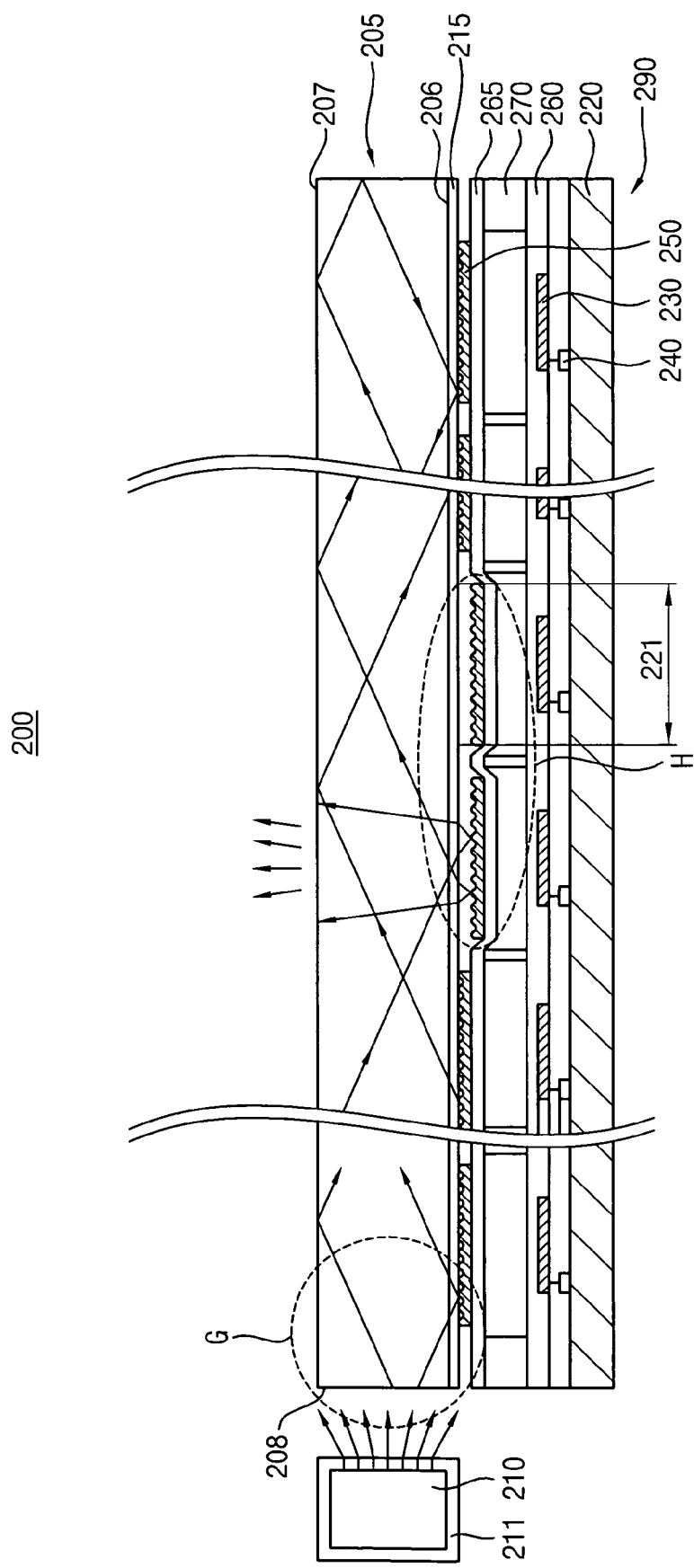
FIG. 9 is a cross-sectional view illustrating a backlight assembly according to another exemplary embodiment of the present invention.

FIG. 9 is a cross-sectional view illustrating a backlight assembly according to another exemplary embodiment of the present invention.

Referring to FIG. 9, a backlight assembly 200 includes a light guide unit 205, a light source 210 and a reflection module 290. In FIG. 9, the backlight assembly 200 is substantially the same as the backlight assembly 100 shown in FIGS. 1 through 3 except for an optical member 215, a shape of the light guide unit 205, and the reflection module 290. Thus, further description of similar elements may be omitted.

The light guide unit 205 includes a reflective face 206, an exiting face 207 and an incident face 208. The reflective face 206 and the exiting face 207 face each other. The incident face 208 connects one end portion of the reflective face 206 to one end portion of the exiting face 207, which faces the one end portion of the reflective face 206. In FIG. 9, the light guide unit 205 has a substantially flat plate shape. Alternatively, the light guide unit 205 may have a wedge shape. When the light guide unit 205 has a wedge shape, a thickness of the light guide unit 205 gradually decreases from the one end portion of the reflective face 206 to another end portion of the reflective face 206, which corresponds to the one end portion of the reflective face 206.

The optical member 215 is adjacent to the reflective face 206. The optical member 215 may include a material having a greater refractive index than the light guide unit 205. In FIG. 9, the optical member 215 includes, for example, a reflective film adhered to the reflective face 206. Alternatively, the optical member 215 may include a thin film deposited on the reflective face 206.

The reflection module 290 faces the reflective face 206. The reflection module 290 includes a first substrate 220, a plurality of lower electrodes 230, a plurality of switch elements 240 and a plurality of upper electrodes 250.

Each of the lower electrodes 230 have substantially same function and structure, each of the switch elements 240 have substantially same function and structure, and each of the upper electrodes 250 have substantially same function and structure. Thus, one lower electrode, one switch element, and one upper electrode will be described in detail hereinafter.

The reflection module 290 is substantially the same as the reflection module 190 shown in FIG. 3 except for driving modes (on and off modes). Thus, further descriptions similar elements may be omitted.

The switch element 240 applies the externally provided on or off signal to the lower electrode 230. The on or off signal may have the same polarity as that of a common signal applied to the upper electrode 250. The other of the on or off signal may have a different polarity from that of the common signal applied to the upper electrode 250. In one embodiment, the one of the on and off signals which has the same polarity as that of the common signal corresponds to the off signal, while the other of the on and off signals which has the different polarity from that of the common signal, corresponds to the on signal.

A repulsive force from the lower electrode 230 acts on the upper electrode 250 facing the lower electrode 230 to which the off signal is applied. Thus, the second insulation layer 265 moves up toward the reflective face 206 of the light guide unit 205. As the second insulation layer 265 moves up, the upper electrode 250 becomes close to the reflective face 206.

In contrast, an attractive force from the lower electrode 230 acts on the upper electrode 250 facing the lower electrode 230 to which the on signal is applied. Thus, the second insulation layer 265 moves down toward the lower electrode 230. Hence, the upper electrode 250 moves farther from the reflective face 206 of the light guide unit 205.

Figure 10:
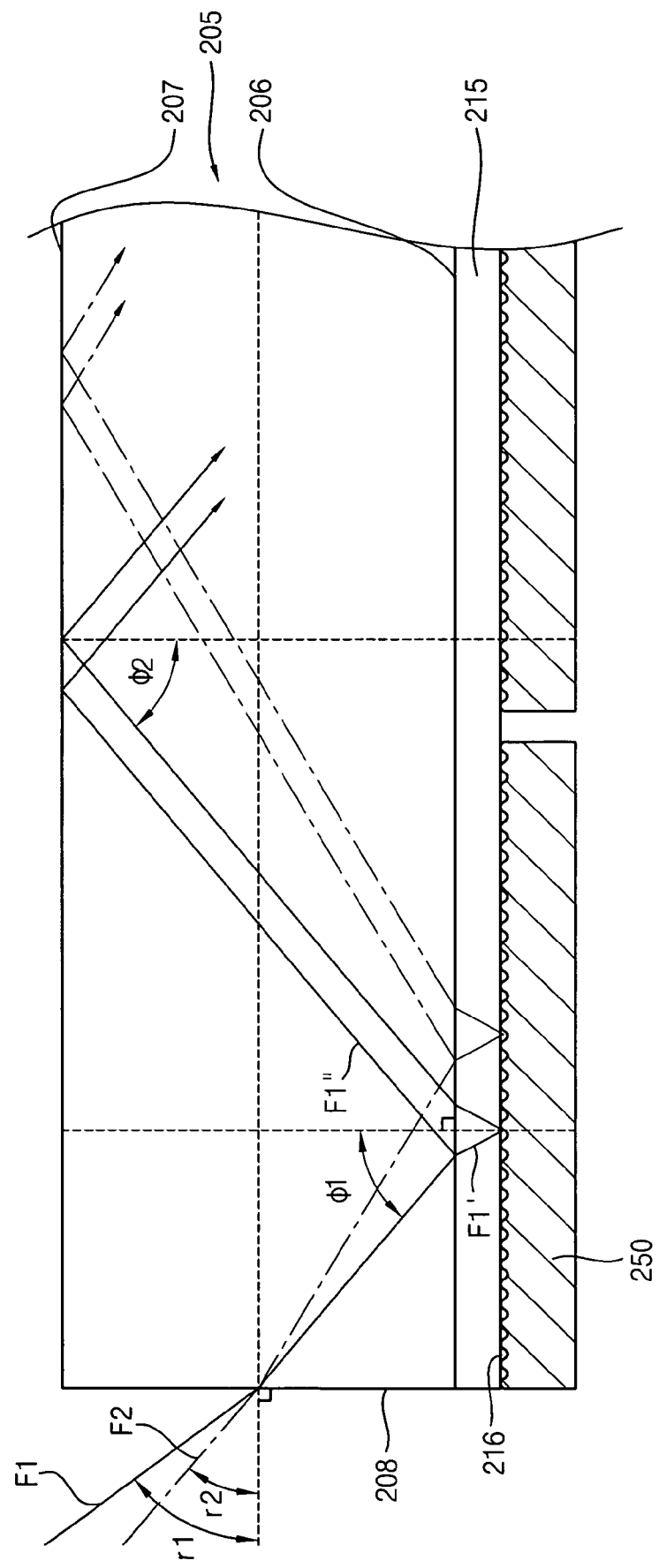
FIG. 10 is an enlarged view illustrating the fourth region 'G' shown in FIG. 9.

FIG. 10 is an enlarged view illustrating the fourth region 'G' shown in FIG. 9.

Referring to FIGS. 9 and 10, light incident on the incident face 208 from the light source 210 forms an incident angle that ranges from a negative first angle −r1 to a positive first angle +r1 with respect to a virtual line that is substantially perpendicular to the light incident face 208.

The amount of incident light increases as the incident angle decreases. First light F1 is defined as light that is incident onto the incident face 208 at an incident angle of the first angle r1, and second light F2 is defined as light that is incident onto the incident face 208 at an incident angle of a second angle r2. The second angle r2 is smaller than the first angle r1.

The first light F1 is incident onto the incident face 208 of the light guide unit 205, and then refracted at the incident face 208. The refracted first light F1 is incident onto the reflective face 206 at an incident angle of a third angle ϕ1. A refractive index n2 of the optical member 215 is greater than a refractive index n1 of the light guide unit 205. Thus, a first portion F1' of the first light F1 that is incident onto the reflective face 206 is refracted at the reflective face 206 to travel through the optical member 215, while a second portion F1" of the first light F1 that is incident onto the reflective face 206 is reflected at the reflective face 206.

When the off signal is applied to the lower electrode 230 and thus the upper electrode 250 makes contact with the reflective face 206, the first portion F1' of the first light F1 that travels through the optical member 215 is reflected on an interface 216 between the optical member 215 and the upper electrode 250. The reflected first portion of the first light F1 enters the light guide unit 205 again, and is refracted at the reflective face 206.

The second portion F" of the first light F1 that is reflected on the reflective face 206 and the first portion F' of the first light F1 that reenters the light guide unit 205 from the optical member 215 are incident onto the exiting face 207 substantially the same incident angle, designated as ϕ2. In one embodiment, the light guide unit 205 may have a wedge shape, so that the incident angle ϕ2 onto the exiting face 207 may be smaller than the incident angle ϕ1 onto the reflective face 206.

In backlight assembly 200, light selectively exits the light guide unit 205 through the exiting face 207 in each of the reflection regions 221, depending on whether one or more of the first electrodes 250 are adjacent interface 216. Thus, the backlight assembly 200 may serve as a light shutter. In each reflection region 221 receiving an "off" signal, light that is incident onto the exiting face 207 may preferably be totally reflected from the exiting face 207. The refractive index n1 of the light guide unit 205 may be determined by an equation of sin (a critical angle for the exiting face 207)=1/n1 for the total internal reflection.

Light received in light guide 205 with an angle of incidence between +r1 and −r1 (e.g., light F2) is incident onto the exiting face 207 at an incident angle that is greater than the incident angle ϕ2 of the first light F1. Thus, with respect to the first light F1, a condition for a total reflection on the exiting face 207 is given by an equation of sin(ϕ2)=1/n1. That is, in order for the light received from the light source 210 to be totally internally reflected from an air interface (for example), the refractive index (with respect to air) for the material of light guide 205 needs to be equal to or greater than n1 in the equation above (since the critical angle decreases as the refractive index increases).

Figure 11:
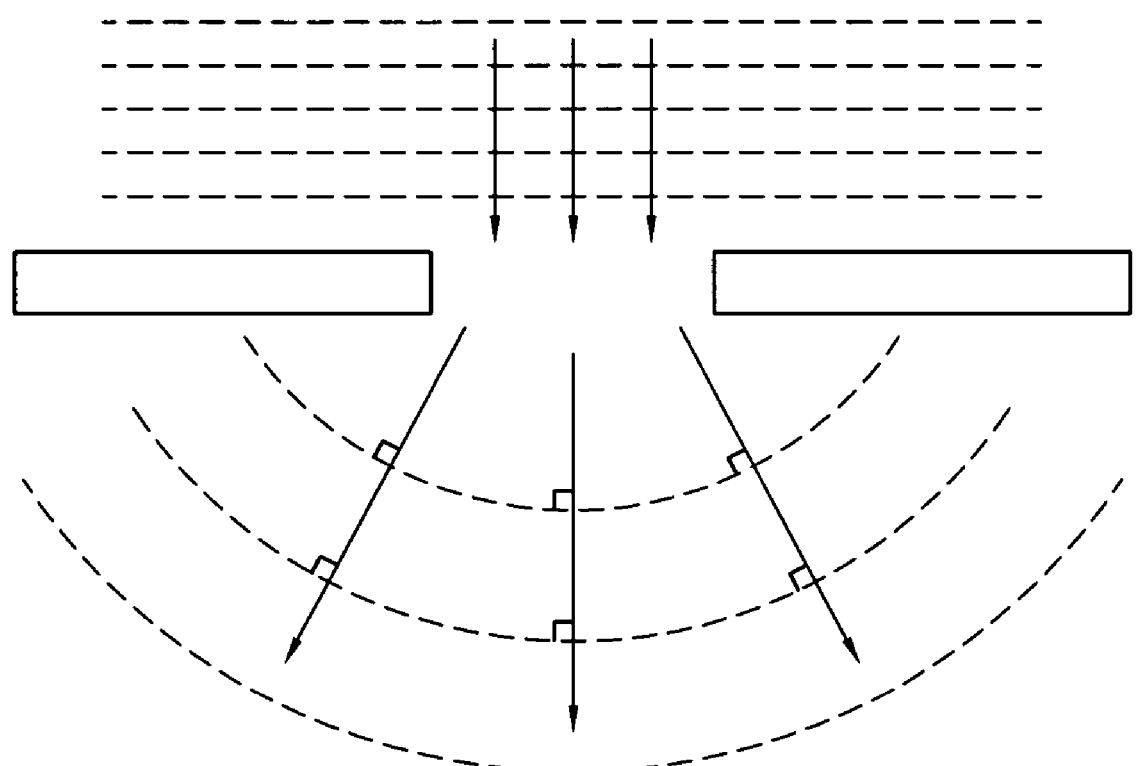
FIG. 11 is a schematic view illustrating a diffraction of a wave passing through a single slit.

FIG. 11 is a schematic view illustrating a diffraction of a wave passing through a single slit.

Referring to FIG. 11, a solid line indicates a direction in which a wave advances, and a dotted line indicates a wavefront that is a surface joining all points of substantially equal phase of the wave. The direction in which the wave advances is substantially perpendicular to the wavefront.

As shown in FIG. 11, when the wave passes through a small aperture, the wave is diffracted at the small aperture. Thus, after passing through the small aperture, the wave advances in various directions. Light passing through a narrow slit conforms to the principle of diffraction.

Figure 12:
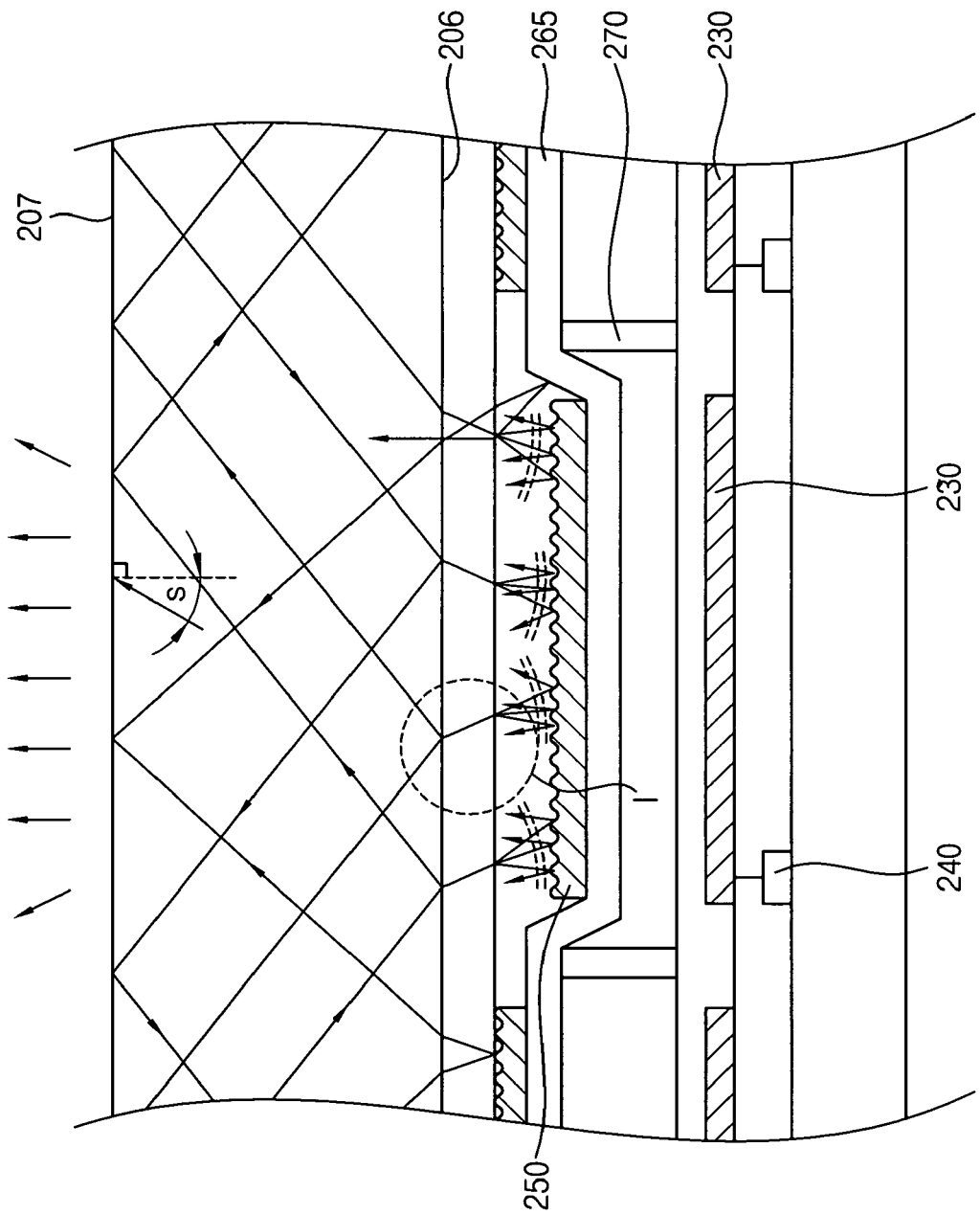
FIG. 12 is an enlarged view illustrating the fifth region 'H' shown in FIG. 9.
Figure 13:
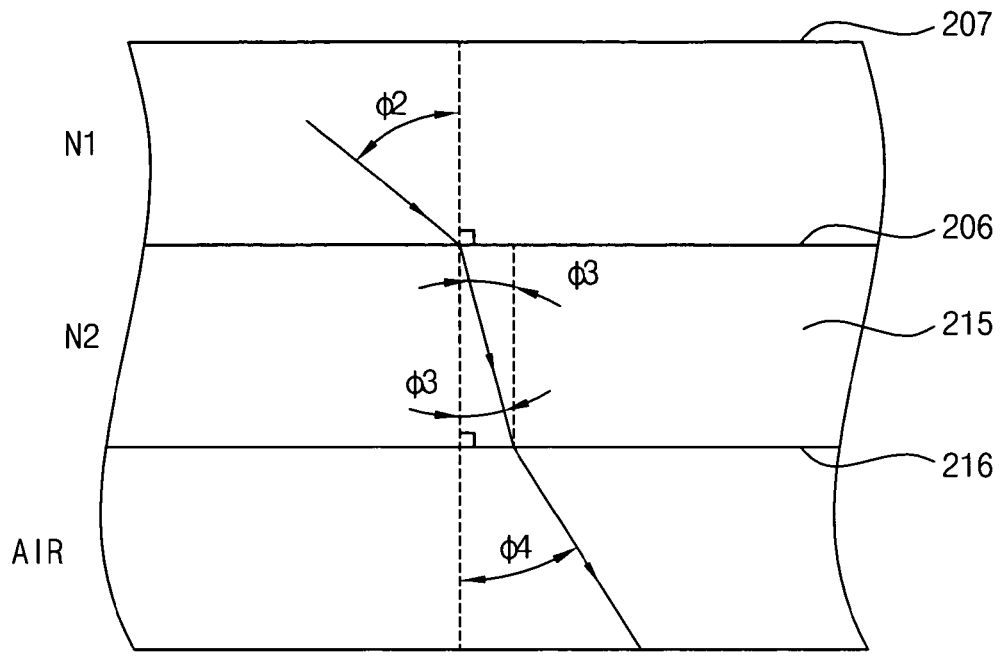
FIG. 13 is an enlarged view illustrating the sixth region 'I' shown in FIG. 12.

FIG. 12 is an enlarged view illustrating the fifth region 'H' shown in FIG. 9. FIG. 13 is an enlarged view illustrating the sixth region 'I' shown in FIG. 12.

Referring to FIGS. 12 and 13, when the off signal is applied to the lower electrode 230 and thus the upper electrode 250 is spaced apart from the reflective face 206, a first portion of the light that is incident onto the reflective face 206 at the incident angle ϕ2 is reflected from the reflective face 206, and a second portion of the light that is incident onto the reflective face 206 at the incident angle ϕ2 is refracted at a first refractive angle ϕ3 and is transmitted into the optical member 215.

In order for the light to selectively exit the light guide unit 205 through the exiting face 207, the light may exit the light guide unit 205 through the optical member 215 to the air layer and thus the light is reflected on the upper electrode 250. The light advances from the optical member 215 that is a more dense medium to the air layer that is a less dense medium, so that total internal reflection may occur at an angle of incidence greater than the critical angle. However, when an incident angle ϕ3 (that is equal to the first refractive angle ϕ3) of the light is smaller than a critical angle for the interface 216 between the air layer and the optical member 215, a portion of the light is reflected at the interface 216, while another portion of the light is refracted at a second refractive angle ϕ4 and exits the optical member 215 to the air layer.

According to Snell's law, with respect to the reflective face 206, an equation of $\sin(\phi 2)/\sin(\phi 3)=n2/n1$ is satisfied. In addition, with respect to the interface 216 between the optical member 215 and the air layer, an equation of $\sin(\phi 3)/\sin(\phi 4)$ =(a refractive index of the air layer)/n2=1/n2 is satisfied (for the case where n2 and n1 are the indexes of refraction with respect to air). From the above equations, the refractive index n2 of the optical member 215 is given by an equation of n2= $\sqrt{n1\sin(\Phi 2)\sin(\Phi 4)}/\sin(\phi 3)$.

Thus, when the incident angle ϕ3 onto the interface 216 is set smaller than the critical angle for the interface 216, the refractive index n2 of the optical member 215 is determined by the equation of n2=$\sqrt{n1\sin(\Phi 2)\sin(\Phi 4)}/\sin(\phi 3)$.

Referring again to FIGS. 11 to 13, the light from the optical member 215 advances between two upper electrodes 250 that make contact with the reflective face 206. Each of the upper electrodes 250 has a micrometer-sized width. Thus, the two upper electrodes 250 that make contact with the reflective face 206 may form a single slit.

As a result, the light that advances between the two upper electrodes 250 adjacent the reflective face 206 is diffracted, so that optical paths of the diffracted light transmitted through interface 216 into the air gap and then incident on the upper electrode 250 in the "on" state have different directions (as shown in FIG. 12). Thus, the light is reflected from the upper electrodes 250 in the "on" state (spaced apart from the reflective face 206), and the reflected light is incident into the optical member 215 to exit the light guide unit 205 through the exiting face 207.

Figure 14:
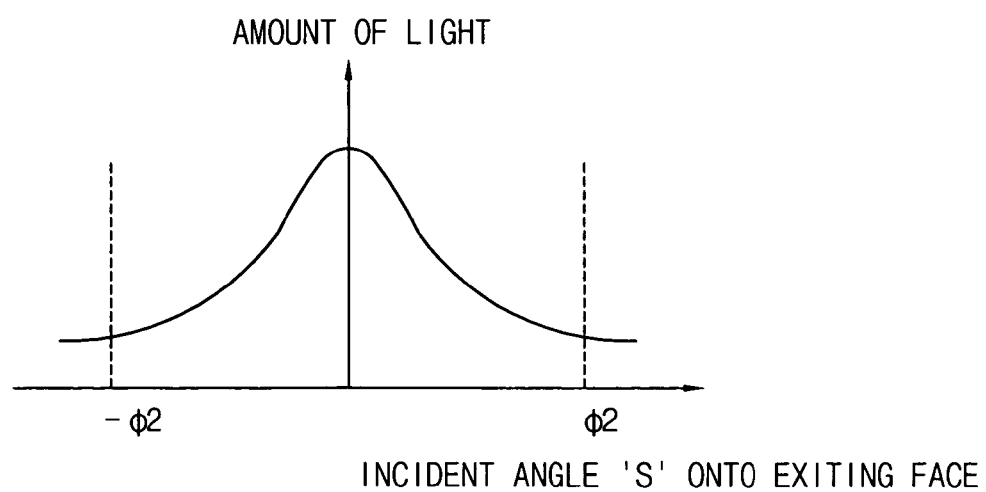
FIG. 14 is a graph illustrating a relationship between an incident angle 'S' onto the exiting face in FIG. 9 and an amount of light.

FIG. 14 is a graph illustrating a relationship between an incident angle 'S' onto the exiting face in FIG. 12 and an amount of light incident on the exiting face having the associated angle.

Referring to FIG. 14, most of the light that is incident onto the exiting face 207 after being reflected on the on-stated upper electrodes 250 has a smaller incident angle than the critical angle for the exiting face 207. Thus, most of the light exits the light guide unit 205 through the exiting face 207.

Figure 15:
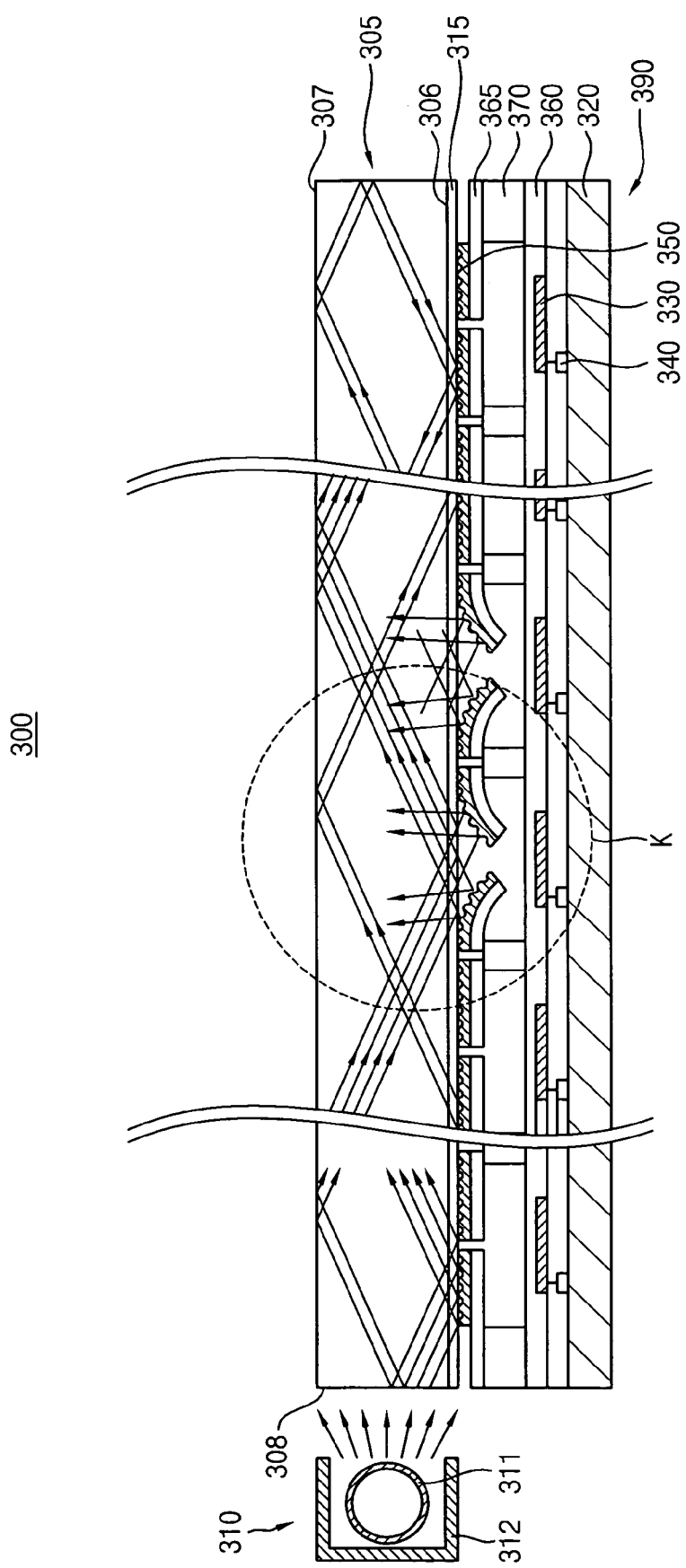
FIG. 15 is a cross-sectional view illustrating a backlight assembly according to still another exemplary embodiment of the present invention.

FIG. 15 is a cross-sectional view illustrating a backlight assembly according to still another exemplary embodiment of the present invention.

Referring to FIG. 15, the backlight assembly 300 includes a light guide unit 305, a light source 310 and a reflection module 390. In FIG. 15, the backlight assembly 300 is substantially the same as the backlight assembly 200 shown in FIG. 9 except for the light source 310 and the reflection module 390. Thus, further descriptions of substantially similar elements may be omitted.

The light guide unit 305 includes a reflective face 306, an exiting face 307 and an incident face 308.

The light source 310 includes a lamp 311 and a lamp reflector 312. The lamp reflector 312 reflects light emitted from the lamp 311 toward the incident face 308.

The reflection module 390 faces the reflective face 306. The reflection module 390 includes a first substrate 320, a plurality of lower electrodes 330, a plurality of switch elements 340 and a plurality of upper electrodes 350.

The reflection module 390 is substantially the same as the reflection module 290 shown in FIG. 9 except for the shape of the second insulation layer 365 and the shape of the upper electrode 350. Thus, further description may be omitted.

Figure 16:
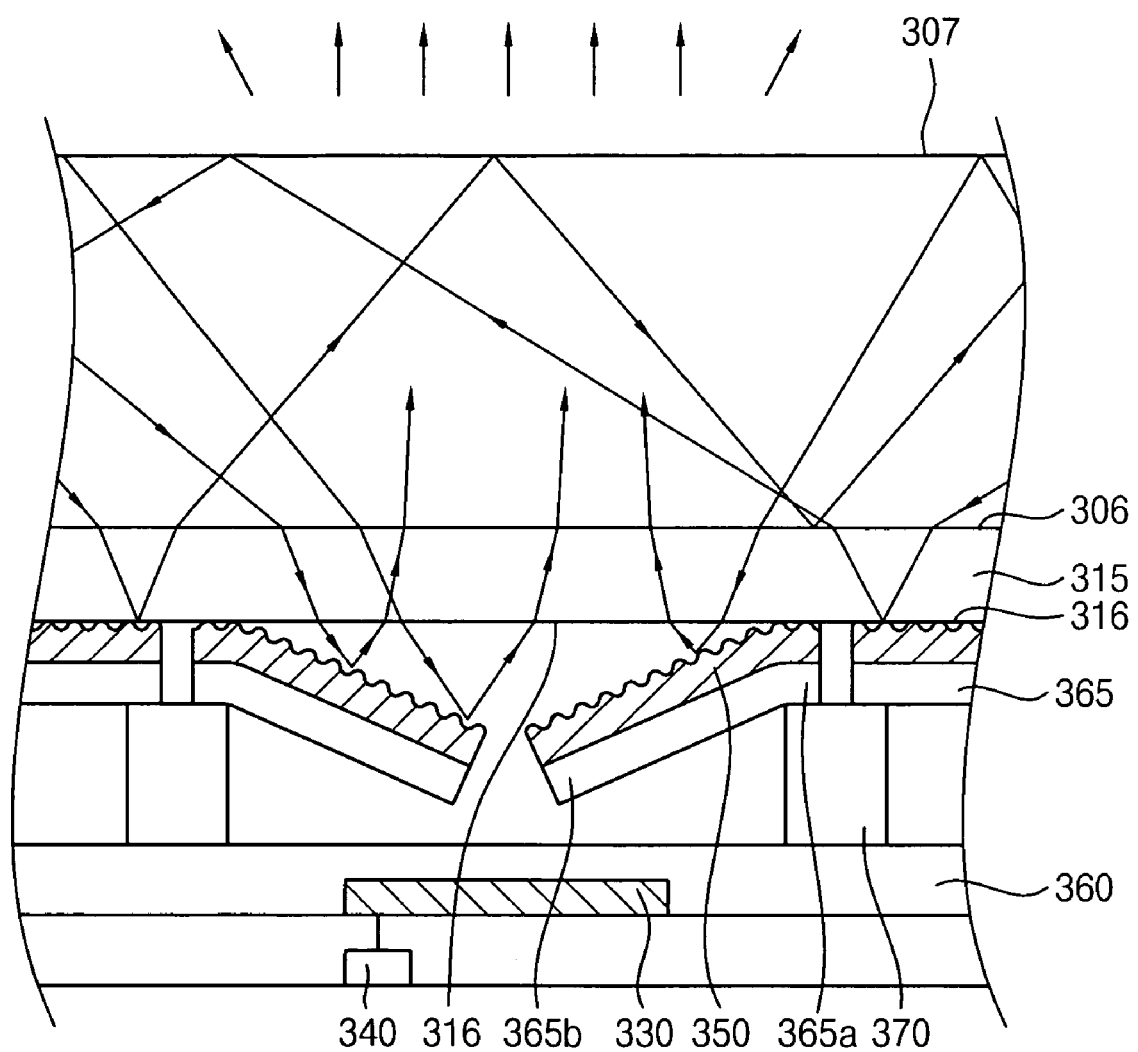
FIG. 16 is an enlarged view illustrating the seventh region 'K' shown in FIG. 15.

FIG. 16 is an enlarged view illustrating the seventh region 'K' shown in FIG. 15.

Referring to FIGS. 15 and 16, the second insulation layer 365 is supported by the spacer 370 and faces the first insulation layer 360. The second insulation layer 365 includes a fixing portion 365a fixed to an upper portion of the spacer 370 and a free portion 365b opposite to the fixing portion 365a.

When an on signal is applied to the lower electrode 330, an attractive force acts on each of the upper electrodes 350 from corresponding one of the lower electrodes 330, so that the free portion 365a is bent toward a central portion of the corresponding lower electrode 330. Thus, each of the upper electrodes 350 makes contact with an interface 316 in the "off" state, but includes at least a portion that is spaced apart from the interface 316 in the "on" state.

When the on signal is applied to the lower electrode 330 and thus the upper electrode 350 is spaced apart from the interface 316, a first portion of the light that is incident onto the reflective face 306 is reflected from the reflective face 306, and a second portion of the light that is incident onto the reflective face 306 is refracted to advance in the optical member 315. Then, the second portion of the light advancing the second optical member 315 is partially reflected on the interface 316 between the second optical member 315 and an air layer, and partially refracted at the interface 316 to exit the second optical member 315 to the air layer.

The light from the optical member 315 advances between two upper electrodes 350 that make contact with the interface 316 (in the "off" state). The two upper electrodes 350 that make contact with the interface 316 may thus form a single slit.

As a result, the light that advances between the two upper electrodes 350 is diffracted, so that optical paths of the diffracted light have a number of different directions. Thus, the light is reflected on the upper electrodes 350 spaced apart from the interface 316 (in the "on" state), and the reflected light is incident into the optical member 315 to exit the light guide unit 305 through the exiting face 307.

Display Device

Figure 17:
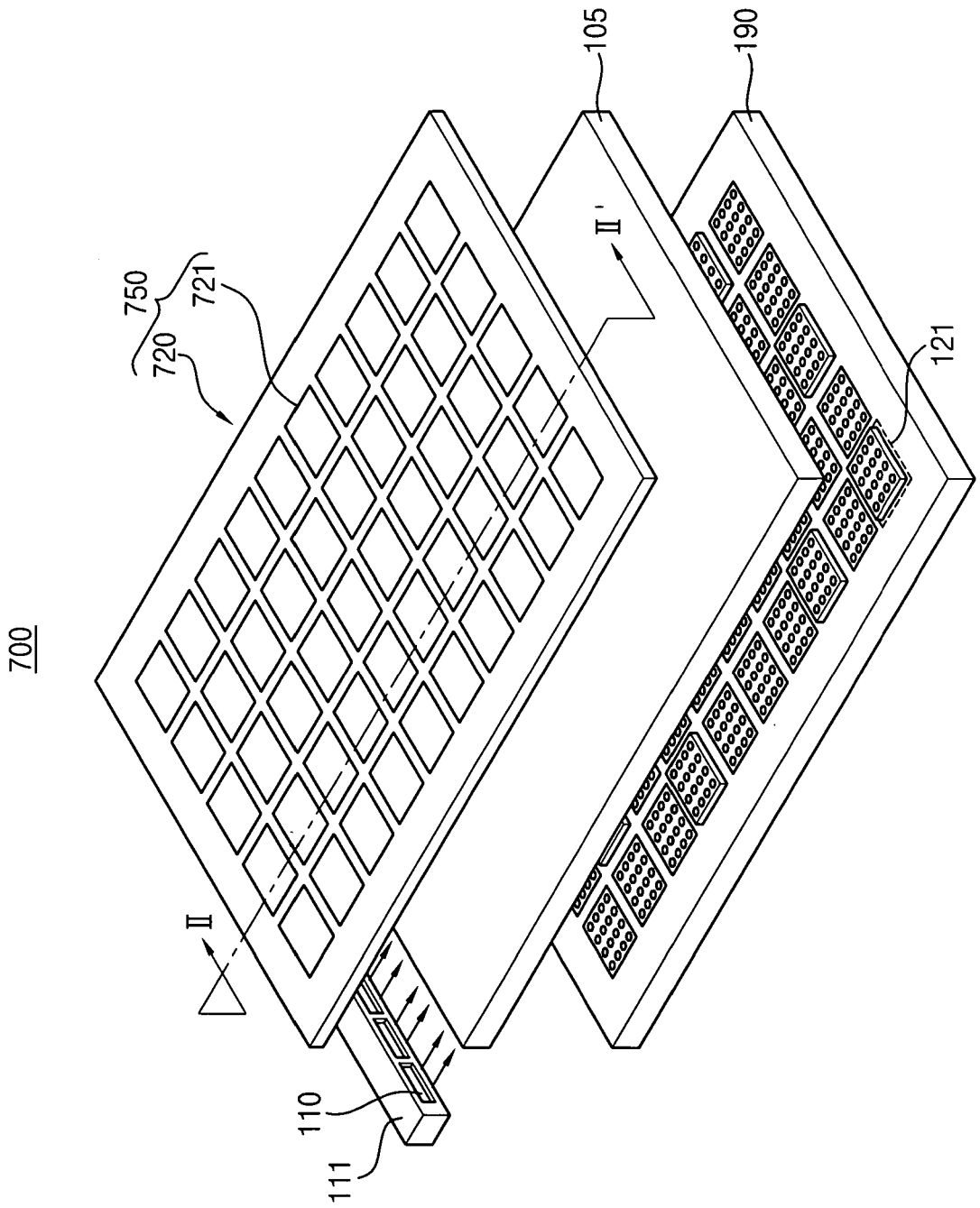
FIG. 17 is an exploded perspective view illustrating a display device according to an exemplary embodiment of the present invention.
Figure 18:
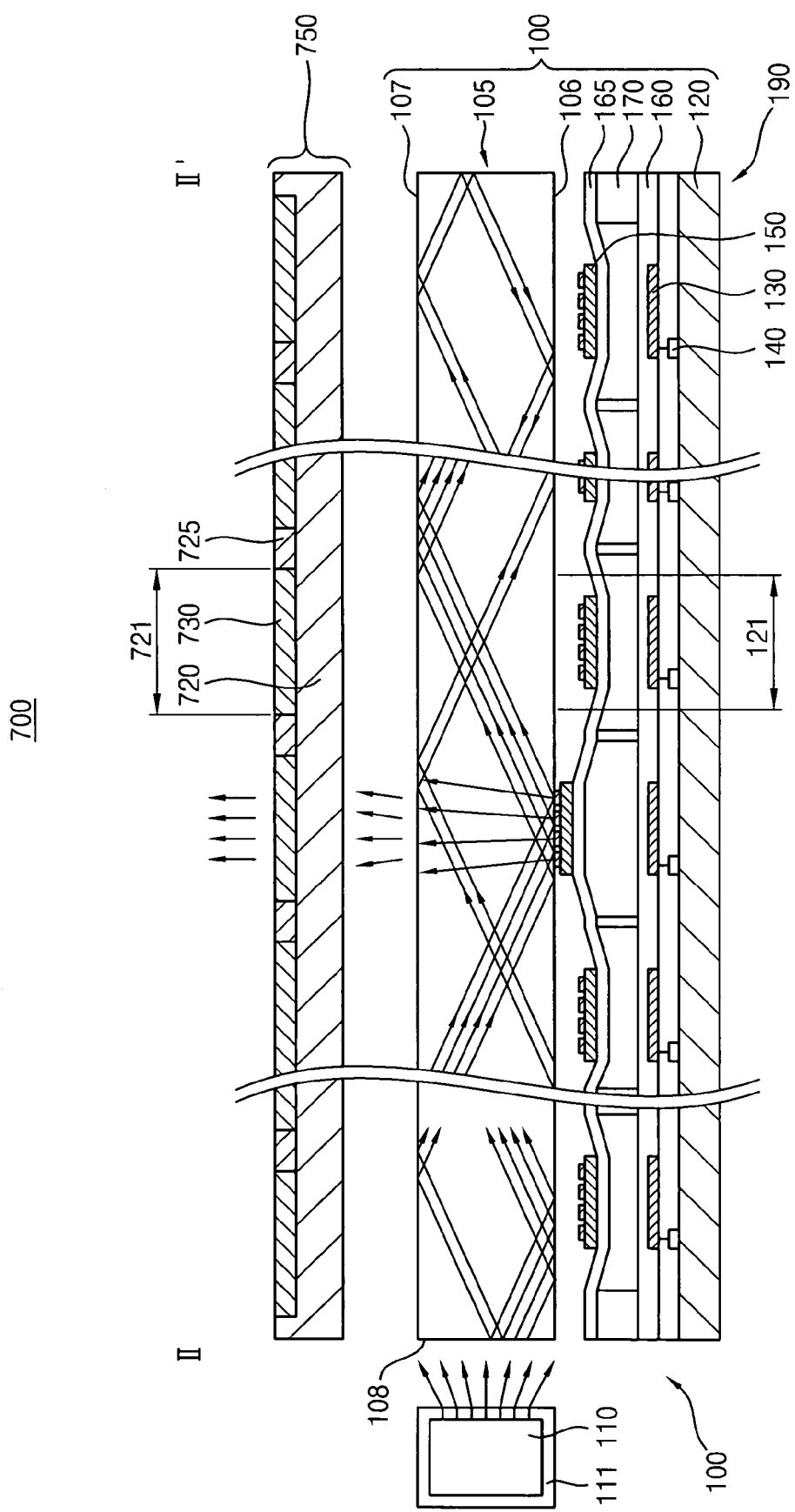
FIG. 18 is a cross-sectional view taken along a line II-II' in FIG. 17.

FIG. 17 is an exploded perspective view illustrating a display device according to an exemplary embodiment of the present invention. FIG. 18 is a cross-sectional view taken along a line II-II' in FIG. 17.

Referring to FIGS. 17 and 18, a display device 700 includes a light guide unit 105, a light source 110, a reflection module 190 and a display module 750. The light guide unit 105, the light source 110 and the reflection module 190 are substantially the same as the light guide unit 105, the light source 110 and the reflection module 190 shown in FIGS. 1 through 8, respectively. Thus, elements that are substantially the same will be represented by the same reference numerals, and further description may be omitted.

The display module 750 is disposed over the light guide unit 105 to display an image using light from the light guide unit 105. The display module 750 includes a second substrate 720 and a plurality of color pixels 730.

The second substrate 720 is disposed over an exiting face 107 of the light guide unit 105. The second substrate 720 has, for example, a plate shape, and may include glass. A plurality of the pixel regions 721 are formed on the second substrate 720. The pixel regions 721 are positioned corresponding to one or more of the reflection regions 121 formed on the first substrate 120.

More than one of the reflection regions 121 may correspond to one of the pixel regions 721. In FIG. 17, one of the pixel regions 721 positioned over one of the reflection regions 121.

Each of the color pixels 730 is formed in one of the pixel regions 721. The color pixels 730 include, for example, red, green and blue color pixels. Each of the color pixels 730 receives light from the exiting face 107 to emit one of red, green and blue colored light.

In FIGS. 17 and 18, the display module 750 optionally includes a light-blocking portion 725. The light-blocking portion 725 is disposed between the pixel regions 721. The light-blocking portion 725 increases a contrast ratio between on-stated color pixels 730 in which light is received and off-stated color pixels 730 in which light is not received.

Color brightness for the color pixels 730 is controlled by controlling the amount of time during which an on signal is applied to the lower electrode 130.

When an on signal is applied to the lower electrode 130, the upper electrode 150 becomes close to the reflective face 106. Thus, light exits the light guide unit 105 through a portion of the exiting face 107, the portion corresponding to the reflective face 106 close to the upper electrode 150. As a result, the display device 700 displays an image.

Display device 700 includes a liquid crystal display panel where a simple structure (including reflection module 190 and display module 750) replace previous, complex designs. Reflection module 190 serves as a light shutter, selectively supplying light to display an image.

Figure 19:
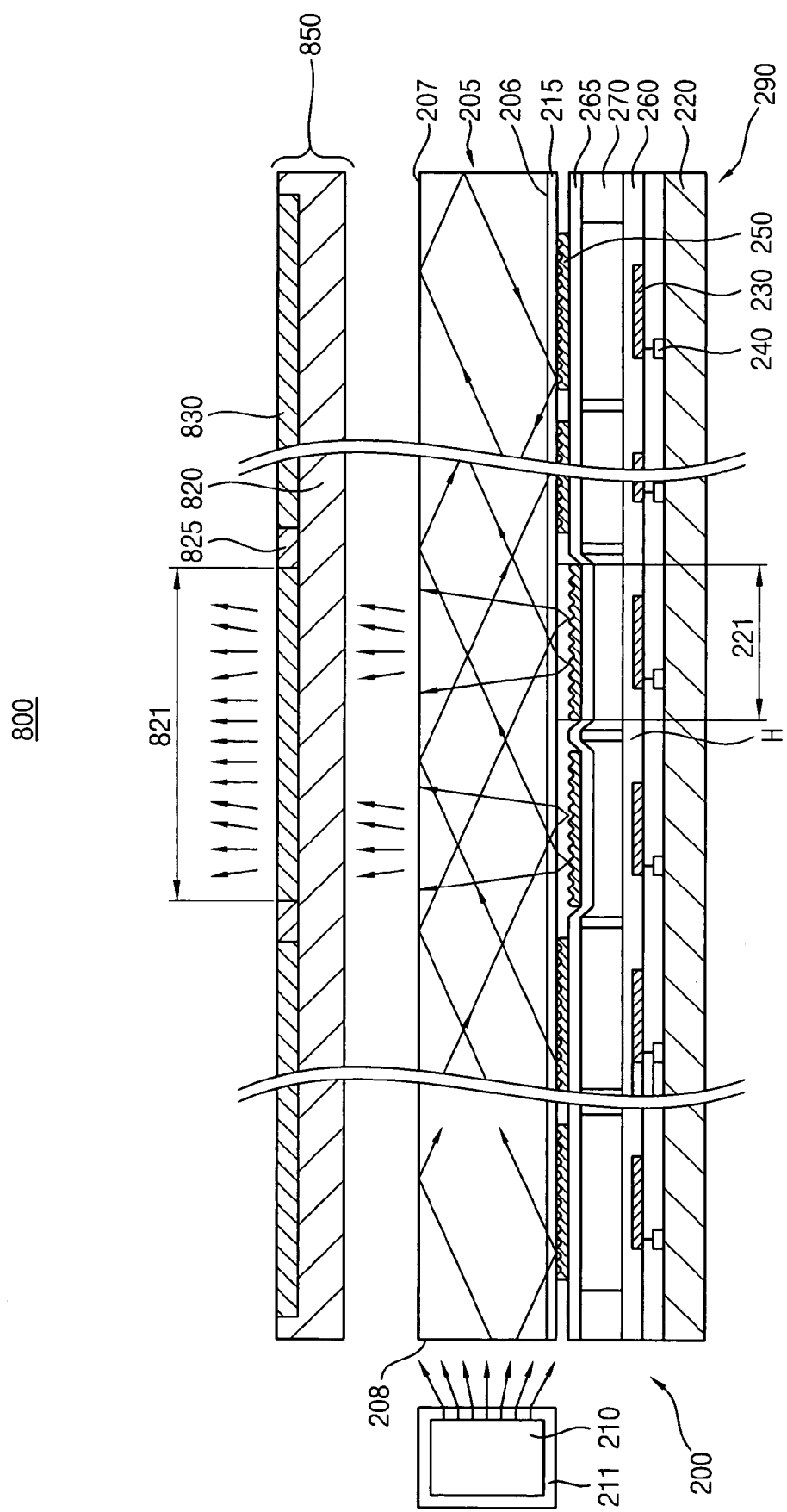
FIG. 19 is a cross-sectional view illustrating a display device according to another exemplary embodiment of the present invention.

FIG. 19 is a cross-sectional view illustrating a display device according to another exemplary embodiment of the present invention.

Referring to FIG. 19, a display device includes a light guide unit 205, a light source 210, a reflection module 290 and a display module 850. The light guide unit 205, the light source 210 and the reflection module 290 are substantially the same as the light guide unit 205, the light source 210 and the reflection module 290 shown in FIGS. 9 through 14, respectively. Thus, substantially similar elements will be represented by the same reference numerals, and further description may be omitted.

The display module 850 includes a second substrate 820 and a plurality of color pixels 830. The display module 850 in FIG. 19 is substantially the same as the display module 750 shown in FIGS. 17 and 18 except for pixel regions. Thus, further description of substantially similar elements may be omitted.

The second substrate 820 is disposed over the exiting face 207. A plurality of pixel regions 821 are formed on the second substrate 820. The pixel regions 821 are positioned corresponding to one or more reflection regions 221 formed on the first substrate 220. More than one of the reflection regions 221 may correspond to one of the pixel regions 821. In FIG. 19, one of the pixel regions 821 is positioned over four of the reflection regions 121.

Figure 20:
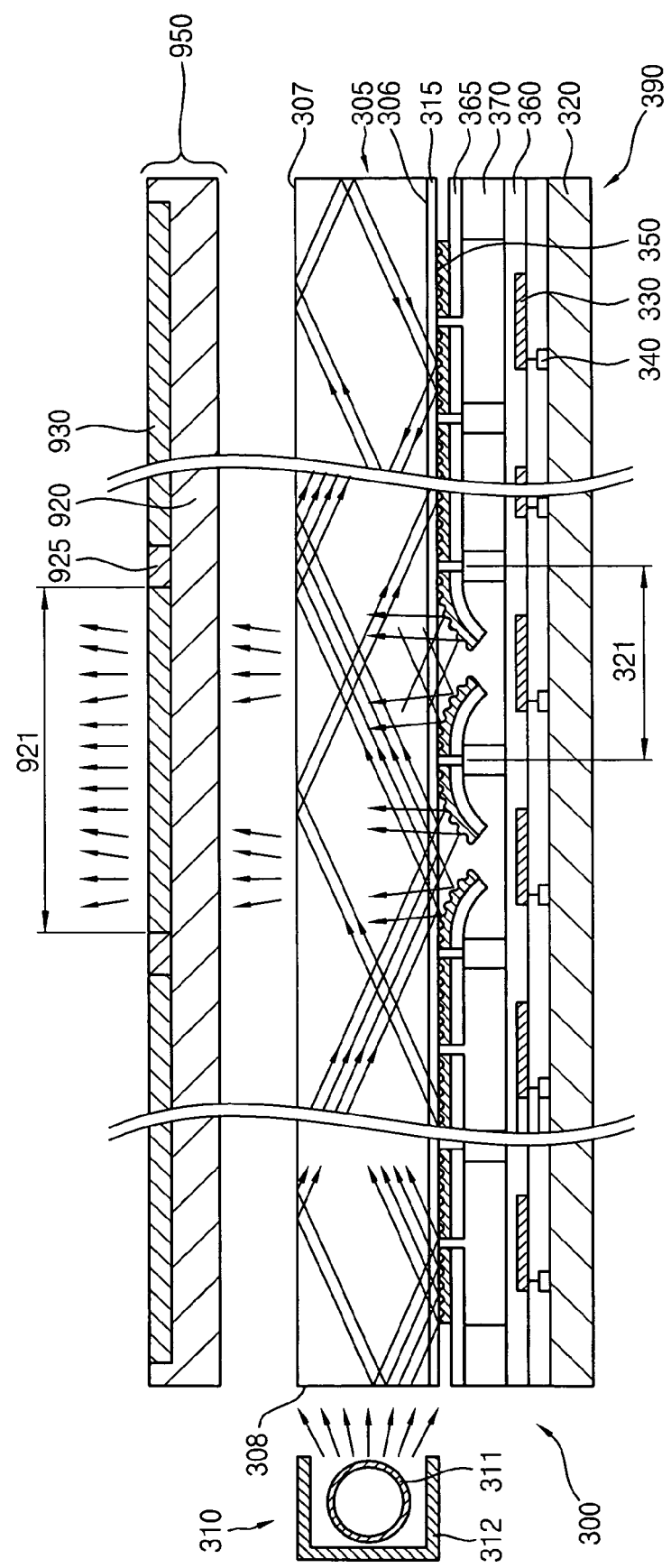
FIG. 20 is a cross-sectional view illustrating a display device according to still another exemplary embodiment of the present invention.

FIG. 20 is a cross-sectional view illustrating a display device according to still another exemplary embodiment of the present invention.

Referring to FIG. 20, a display device includes a light guide unit 305, a light source 310, a reflection module 390 and a display module 950. The light guide unit 305, the light source 310 and the reflection module 390 are substantially the same as the light guide unit 305, the light source 310 and the reflection module 390 shown in FIGS. 15 and 16, respectively. Thus, substantially similar elements will be represented by the same reference numerals, and further description may be omitted.

The display module 950 includes a second substrate 920 and a plurality of color pixels 930. The display module 950 in FIG. 20 is substantially the same as the display module 750 shown in FIGS. 17 and 18 except for pixel regions. Thus, further description of substantially similar elements may be omitted.

The second substrate 920 is disposed over the exiting face 307. A plurality of pixel regions 921 are formed on the second substrate 920. The pixel regions 921 are positioned corresponding to one or more reflection regions 321 formed on the first substrate 320. More than one of the reflection regions 321 may correspond to one of the pixel regions 921. In FIG. 20, one of the pixel regions 921 is positioned over four of the reflection regions 321.

According to embodiments of the present invention, the backlight assembly functions as a light shutter, which selectively emits light in each reflection region.

In particular, as an upper electrode disposed in each reflection region makes contact with or is spaced apart from a reflective face of a light guide unit (or an optical member), light inside the light guide unit may be totally reflected on the reflective face of the light guide unit, may be partially reflected on the reflective face of the light guide unit or may exit the light guide unit through the reflective face. Light that exits the light guide unit through the reflective face is reflected on the upper electrode to exit the light guide unit through an exiting face of the light guide unit.

Thus, the systems and techniques provided herein provide for a simplified display device structure. Rather than including separate elements such as liquid crystal layers and the associated structure, display modules described herein include a color pixel for displaying a color based on light exiting the light guide unit through the exiting face, and a reflection unit for selectively reflecting light from a light source. The display module thus serves as a simple and effective light shutter to display images.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
   a light guide unit having a reflective face and a light exiting face opposite the reflective face;
   a light source configured to provide light onto an incident face of the light guide unit; and
   a reflection module disposed adjacent the reflective face of the light guide unit and configured to selectively reflect or scatter the light from the light guide unit in response to one or more control signals received by the reflection module including an on signal and an off signal, causing the reflected or scattered light to be emitted from the light guide unit through the light exiting face, the reflection module being disposed on the reflective face so that the reflective face is disposed between the light exiting face and the reflection module.

2. The backlight assembly of claim 1, wherein the reflection module comprises:
   a first substrate having a surface facing the reflective face of the light guide unit and a plurality of reflection regions formed over the surface;
   a plurality of lower electrodes each disposed in one of the reflection regions;
   a plurality of associated switch elements disposed on the first substrate to apply an on signal or an off signal to an associated lower electrode; and
   a plurality of upper electrodes positioned corresponding to the lower electrodes, the upper electrodes configured to contact the reflective face of the light guide unit in response to one of the on signal and the off signal received at the associated lower electrodes and to be separated from the reflective face of the light guide unit in response to the other of the on signal and the off signal received at the associated lower electrodes, wherein the backlight assembly is configured to emit the light that is incident onto the reflective face of the light guide unit through an exiting face of the light guide unit in one or more regions of the exiting face of the light guide unit associated with an on signal applied to an associated lower electrode.

3. The backlight assembly of claim 2, wherein the upper electrodes are separated from the reflective face of the light guide unit in response to the associated lower electrodes receiving the off signal so that light that is incident on the associated regions of the reflected face is totally internally reflected and the light that is incident on associated regions of the exiting face of the light guide unit is totally internally reflected.

4. The backlight assembly of claim 2, wherein the upper electrodes contact the reflective face of the light guide unit in response to the associated lower electrodes receiving the on signal so that light that is incident on associated regions of the reflective face is reflected and light that is incident on associated regions of the exiting face of the light guide unit is emitted.

5. The backlight assembly of claim 2, wherein each of the upper electrodes comprise a protrusion configured to scatter incident light.

6. The backlight assembly of claim 2, further comprising an optical member disposed between the light guide unit and the reflection module, the optical member having a refractive index greater than that of the light guide unit.

7. The backlight assembly of claim 6, wherein the optical member is positioned contacting the reflective face of the light guide unit.

8. The backlight assembly of claim 6, wherein the upper electrodes are configured to contact the reflective face of the light guide unit in response to the off signal received at the associated lower electrodes so as to reflect the light that is incident onto associated regions of the reflective face of the light guide unit and emit the reflected light through associated regions of the exiting face of the light guide unit.

9. The backlight assembly of claim 6, wherein the upper electrodes are separated from the reflective face of the light guide unit in response to the on signal received at the associated lower electrodes so as to totally reflect light that is incident on associated regions of the reflective face of the light guide unit and to totally reflect the reflected light on associated regions of the exiting face of the light guide unit.

10. The backlight assembly of claim 6, wherein the reflection module comprises:
   a first insulation layer formed on the lower electrodes and configured to insulate the lower electrodes,
   a second insulation layer positioned facing the first insulation layer, the upper electrodes being disposed on the second insulation layer; and
   a plurality of spacers formed between the first and second insulation layers to support the second insulation layer, the spacers positioned corresponding to peripheral portions of the lower electrodes.

11. The backlight assembly of claim 10, wherein the second insulation layer comprises:
   a plurality of fixing portions each fixed to an upper portion of an associated spacer; and
   a plurality of free portions opposite to the fixing portions, and wherein assembly is configured so the upper electrodes are separated from the reflective face of the light guide unit when the associated free portions are bent toward a central portion of the associated lower electrode.

12. The backlight assembly of claim 2, wherein the reflection module further comprises:
   a plurality of first signal lines arranged on the first substrate in a first direction to apply a control signal to the switch elements, the control signal for each switch element configured to control the application of the on signal or the off signal to the associated lower electrode; and
   a plurality of second signal lines arranged on the first substrate in a second direction crossing the first direction to apply the on signal or the off signal to the associated lower electrode.

13. The backlight assembly of claim 12, wherein each of the reflection regions is defined by consecutive first signal lines and consecutive second signal lines.

14. A display device comprising:
   a light guide unit having a reflective face and a light exiting face opposite the reflective face;
   a light source configured to provide light onto an incident face of the light guide unit;
   a reflection module disposed adjacent to the reflective face of the light guide unit and configured to selectively reflect or scatter the light from the light guide unit in response to one or more control signals received by the reflection module, said one or more control signals including an on signal and an off signal, causing the reflected or scattered light to be emitted from the light guide unit through the light exiting face; and
   a display module disposed adjacent the light guide unit light exiting face to display an image using light emitted from the light guide unit,
   wherein the reflection module is disposed on the reflective face so that the reflective face is disposed between the light exiting face and the reflection module.

15. The display device of claim 14, wherein the display module comprises color pixels formed in a plurality of pixel regions.

16. The display device of claim 14, wherein the reflection module comprises:
   a first substrate having a surface facing the reflective face of the light guide unit and a plurality of reflection regions formed over the surface;
   a plurality of lower electrodes each disposed in one of the reflection regions;
   a plurality of associated switch elements disposed on the first substrate to apply the on signal or the off signal to an associated lower electrode; and
   a plurality of upper electrodes positioned corresponding to the lower electrodes, the upper electrodes configured to contact the reflective face of the light guide unit in accordance with the on signal or the off signal received at the associated lower electrodes to emit light that is incident onto associated regions of the reflective face of the light guide unit through associated regions of an exiting face of the light guide unit.

17. The display device of claim 16, wherein the reflection module comprises:
   a first insulation layer formed on the lower electrodes and configured to insulate the lower electrodes;
   a second insulation layer positioned facing the first insulation layer, the upper electrode being disposed on the second insulation layer; and
   a plurality of spacers formed between the first and second insulation layers to support the second insulation layer, the spacers positioned corresponding to peripheral portions of the lower electrodes.

18. The display device of claim 17, wherein the second insulation layer comprises:
   a plurality of fixing portions each fixed to an upper portion of an associated spacer; and
   a plurality of free portions opposite to the fixing portions, and wherein assembly is configured so the upper electrodes are separated from the reflective face of the light guide unit when the associated free portions are bent toward a central portion of the associated lower electrode.

19. A display apparatus comprising:
   a light guide including an optical interface surface and a light exit surface different than the optical interface surface;
   a plurality of optical reflector elements configured to reflect incident light;
   a first actuator configured to selectively position a first optical reflector element in a first position away from the optical interface surface or a second position proximate to the optical interface surface; and
   wherein, in response to an "on" control signal, the first actuator is configured to selectively position the first optical reflector element in one of the first position or the second position to reflect light to be transmitted through a first associated region of the light exit surface of the light guide.

20. The display apparatus of claim 19, wherein the first actuator comprises a first electrode configured to generate an electric field in response to a first control voltage, and wherein the first optical reflector comprises a second electrode on a flexible material.

21. The display apparatus of claim 19, wherein the light guide includes an incident surface positioned to receive light from a light source.

22. The display apparatus of claim 19, wherein, in response to an "off" control signal, the first actuator is configured to selectively position the first optical reflector element in the other of the first position and the second position so that light is substantially not transmitted through the first associated region of the light exit surface of the light guide.

23. The display apparatus of claim 19, wherein the apparatus includes a plurality of actuators each configured to position an associated optical reflector elements in a first position away from the optical interface surface or a second position proximate to the optical interface surface in response to an associated "on" control signal, and configured to position the associated optical reflector in the other of the first position and the second position in response to an associated "off" control signal.

24. The display apparatus of claim 23, wherein each of the plurality of optical reflectors is associated with a region of the light exit surface of the light guide, and wherein the display apparatus is configured to totally internally reflect light from each region of the light exit surface of the light guide associated with an optical reflector positioned in the other of the first position and the second position in response to the associated "off" control signal.

25. The display apparatus of claim 19, wherein the light guide comprises a material with an index of refraction $n1$ greater than the index of refraction of air.

26. The display apparatus of claim 25, wherein, in response to the "on" control signal, the first actuator is configured to selectively position the first optical reflector element in the second position.

27. The display apparatus of claim 19, wherein the light guide includes a first material having an index of refraction $n1$ greater than the index of refraction of air, a second material having an index of refraction $n2$ greater than $n1$, and wherein the optical interface surface is a surface of the second material.

28. The display apparatus of claim 19, further comprising a display module including a plurality of pixels, each pixel positioned to receive light from at least one associated region of the light exit surface of the light guide.

* * * * *